(12) United States Patent
Friedman et al.

(10) Patent No.: US 11,662,038 B1
(45) Date of Patent: May 30, 2023

(54) MODULAR VALVE ASSEMBLY

(71) Applicant: Humphrey Products Company, Kalamazoo, MI (US)

(72) Inventors: Mark Friedman, Portage, MI (US); Matthew Welker, Kalamazoo, MI (US)

(73) Assignee: Humphrey Products Company, Kalamazoo, MI (US)

( * ) Notice: Subject to any disclaimer, the term of this patent is extended or adjusted under 35 U.S.C. 154(b) by 231 days.

(21) Appl. No.: 16/741,312

(22) Filed: Jan. 13, 2020

Related U.S. Application Data

(60) Provisional application No. 62/865,368, filed on Jun. 24, 2019, provisional application No. 62/791,480, filed on Jan. 11, 2019.

(51) Int. Cl.
| | | |
|---|---|---|
| *F16K 27/00* | (2006.01) | |
| *F16K 27/02* | (2006.01) | |
| *F16K 11/22* | (2006.01) | |
| *F16K 11/24* | (2006.01) | |

(52) U.S. Cl.
CPC ............ *F16K 27/003* (2013.01); *F16K 11/22* (2013.01); *F16K 11/24* (2013.01); *F16K 27/029* (2013.01)

(58) Field of Classification Search
CPC ............ F16J 15/028; Y10T 137/87153; Y10T 137/6011; Y10T 137/6017; Y10T 137/87885; F16K 27/003; F16K 11/24; F16K 11/0716; F16K 11/07; F16L 11/22; F15B 13/0817
See application file for complete search history.

(56) References Cited

U.S. PATENT DOCUMENTS

| | | | | |
|---|---|---|---|---|
| 3,509,904 A | * | 5/1970 | Paule ...................... | F16L 29/00 137/884 |
| 3,747,623 A | * | 7/1973 | Greenwood ............ | F16K 11/22 137/625.65 |
| 4,524,807 A | * | 6/1985 | Toliusis .................. | F16L 37/56 137/884 |
| 6,374,859 B1 | * | 4/2002 | Vu ........................ | F16K 27/003 137/884 |

(Continued)

OTHER PUBLICATIONS https://www.dictionary.com/browse/aperture[Sep. 12, 2022 4:52:23 PM] (Year: 2022).*

*Primary Examiner* — Jessica Cahill
(74) *Attorney, Agent, or Firm* — Gardner, Linn, Burkhart & Ondersma LLP

(57) ABSTRACT

A modular valve assembly is formed from multiple modular valves having a valve base and a valve actuator. Each base includes at least a first channel and a second channel and an internal passage forming an opening in the first channel so as to be in selective fluid communication with an exterior port of the valve base, and with the second channel being a through passage that is not in fluid communication with the internal passage. Adjacent valve bases are interconnectable in one of two orientations either with the first and second channels of one valve base being aligned with the first and second channels, respectively, of an adjacent valve base, or with the first and second channels of one valve base being aligned with the second and first channels, respectively, of an adjacent valve base. The valve bases may be provided with third and fourth channels for three-way operability.

21 Claims, 23 Drawing Sheets

(56) References Cited

U.S. PATENT DOCUMENTS

| | | | |
|---|---|---|---|
| 6,874,537 B2 * | 4/2005 | Hayashi | F15B 13/0857 |
| | | | 137/884 |
| 7,178,556 B2 * | 2/2007 | Reid, II | F16K 27/003 |
| | | | 137/271 |
| 8,307,854 B1 * | 11/2012 | Vu | F16K 27/003 |
| | | | 137/884 |
| 9,494,245 B1 * | 11/2016 | Tinholt | B29C 45/14065 |
| 10,627,034 B2 * | 4/2020 | Sasaki | F16L 41/03 |
| 10,663,072 B2 * | 5/2020 | Birtcher | F16K 27/003 |
| 10,746,201 B2 * | 8/2020 | Weickel | B33Y 80/00 |
| 11,009,143 B1 * | 5/2021 | Brookins | F15B 13/0817 |
| 2002/0020445 A1 * | 2/2002 | Hettinger | F15B 13/0814 |
| | | | 137/270 |
| 2015/0292647 A1 * | 10/2015 | Le Pellec | F15B 13/0814 |
| | | | 137/606 |
| 2020/0173571 A1 * | 6/2020 | Heyral | F16K 27/003 |

* cited by examiner

MODULAR VALVE ASSEMBLY

CROSS REFERENCE TO RELATED APPLICATION

The present application claims priority of U.S. provisional applications Ser. Nos. 62/791,480 filed Jan. 11, 2019, and 62/865,368 filed Jun. 24, 2019.

BACKGROUND AND FIELD OF THE INVENTION

The present invention is directed to valves, and in particular to modular valve assemblies and including modular valve assemblies employing an expandable seal used between mating parts of a modular valve assembly.

Valves include one or more input ports and one or more output ports. Two-way valves include an input port and an output port. Three-way valves may be configured for mixing where two input ports selectively feed into a single output port. Alternatively, three-way valves may be configured for diverting where one input port selectively feeds into two output ports.

SUMMARY OF THE INVENTION

The present invention provides a modular valve assembly constructed of interconnected modular valves that may be connected together in differing orientations to provide differing functionality.

According to an aspect of the present invention, a modular valve assembly is formed from multiple modular valves having a valve base and a valve actuator. Each base includes at least a first channel extending between first channel end ports, a second channel extending between second channel end ports. An internal passage forms an opening in the first channel so as to be in selective fluid communication with an exterior port of the valve base, with the second channel constructed as a through passage that is not in fluid communication with the internal passage. Adjacent valve bases are interconnectable in one of two orientations either with the first and second channels of one valve base being aligned with the first and second channels, respectively, of an adjacent valve base, or with the first and second channels of one valve base being aligned with the second and first channels, respectively, of an adjacent valve base.

In a particular configuration the first channel and second channel are oriented in parallel. In further embodiments the valve base may include two exterior ports on opposite sides from each other. Still further, the first channel end ports may include a male port at one end of and a female port at the opposite end with the second channel end ports including a male port at one end and a female port at the opposite end, with the male port of the first channel being adjacent the female port of the second channel and the female port of the first channel being adjacent the male port of the first channel. In a further configuration, the valve base may include a top side having a first opening in communication with the internal passage and a second opening in communication with the exterior port.

Still further, the valve bases may be in adjacent mating engagement at mating surfaces with the valve bases including cavities at the mating surfaces where the cavities of adjacent valve bases are aligned when the valve bases are engaged together. Expandable seals may then be disposed in adjacent aligned cavities with the expandable seals contacting sealing surfaces in each of the cavities. The expandable seals include a flexible cover disposed about a rigid internal support. In a particular embodiment, the support of the expandable seals includes a pair of distally opposed support ends with the support including at least one aperture between the support ends, and with the cover having a pair of distally opposed cover ends, with each cover end being engaged with an external portion of a respective one of the support ends, and with the cover including a central section disposed between the cover ends with the central section being disposed over the aperture of the support.

In a further embodiment that is operable as a three-way valve system the internal passage of the valve bases comprises a valve bore and the valve bases include a third channel disposed and extending between third channel end ports and a fourth channel disposed and extending between fourth channel end ports. In such a configuration when adjacent valve bases are interconnected with the first and second channel of one valve base aligned with the first and second channel, respectively, of an adjacent valve base, the third and fourth channel of the one valve base are aligned with the third and fourth channel, respectively, of the adjacent valve base. Likewise, when adjacent valve bases are interconnected with the first and second channel of one valve base aligned with the second and first channel, respectively, of an adjacent valve base, the third and fourth channel of the one valve base are aligned with the fourth and third channel, respectively, of the adjacent valve base.

In this three-way embodiment the valve bore forms openings in the third and fourth channels whereby the third and fourth channels are in selective fluid communication with the exterior port. Internal walls are also disposed in the third and fourth channels to block flow there through.

The modular valves and modular valve assemblies provide for the flexible arrangement of modular valves in different orders and orientations through the use of reversible valve bases and selectable outlet ports. A single two-way or three-way modular valve may be orientated/reversed with relation to other modular valves in the valve assembly to provide for different outlet ports/and inlet port combinations, operation and functionality, including with having a single supply and/or return line from and to the assembly. These and other objects, advantages, purposes and features of this invention will become apparent upon review of the following specification in conjunction with the drawings.

DESCRIPTION OF THE PREFERRED EMBODIMENTS

The present invention will now be described with reference to the accompanying figures, wherein the numbered elements in the following written description correspond to like-numbered elements in the figures. As discussed herein, exemplary two-way and three-way modular valves are configured such that when coupled together a modular valve assembly may be formed. Exemplary modular valves are configured for controlling the passage of fluids, such as liquids or gases that may be aided with the use of controlling valves. Adjacent modular valves may be assembled together in either of two 180 degree orientations to configure the modular valve assembly for a particular flow arrangement.

Figure 1:
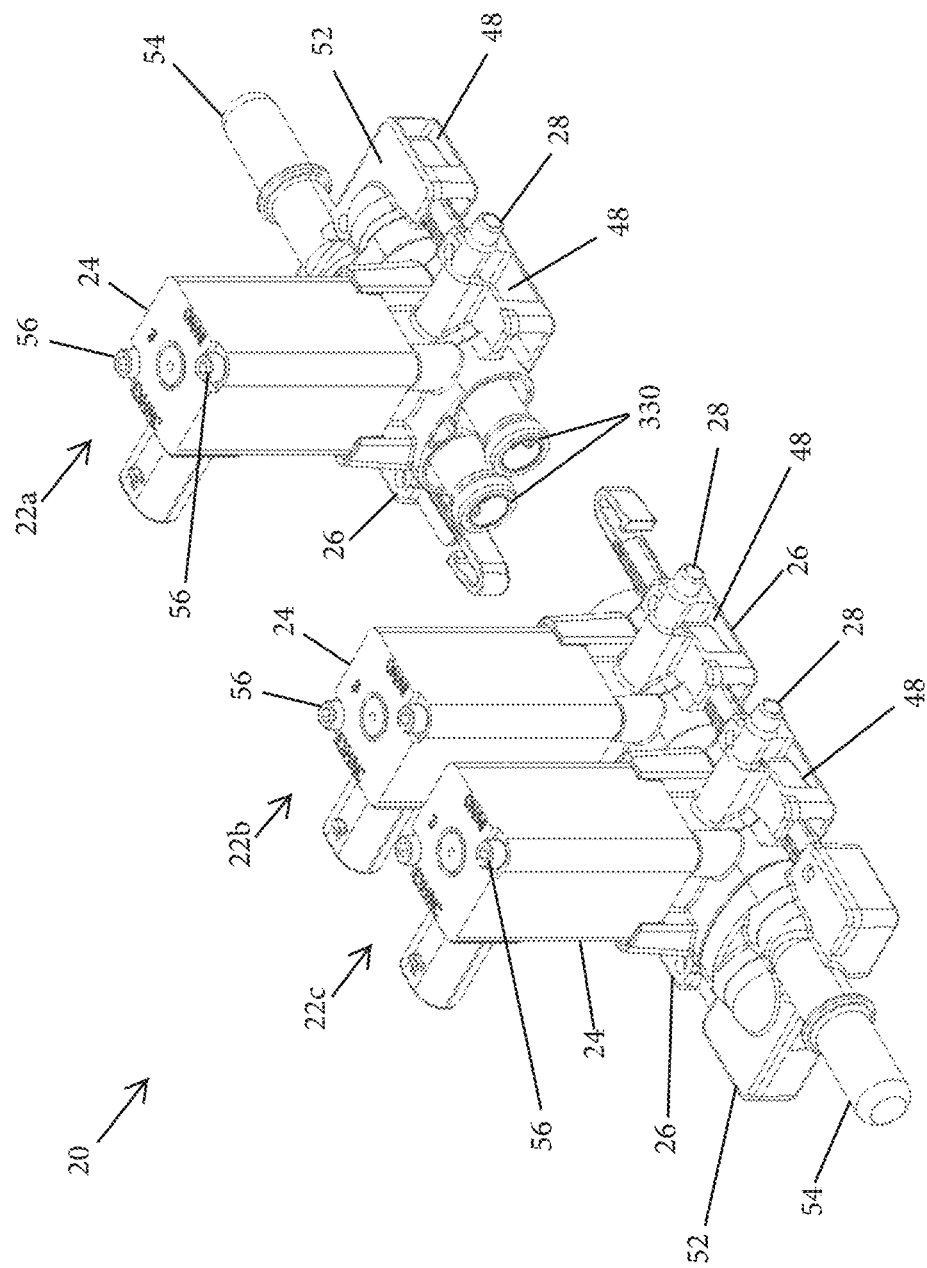
FIG. 1 is a perspective view of an embodiment of a two-way modular valve assembly in accordance with the present invention with one of the modular valves shown disconnected.
Figure 2A:
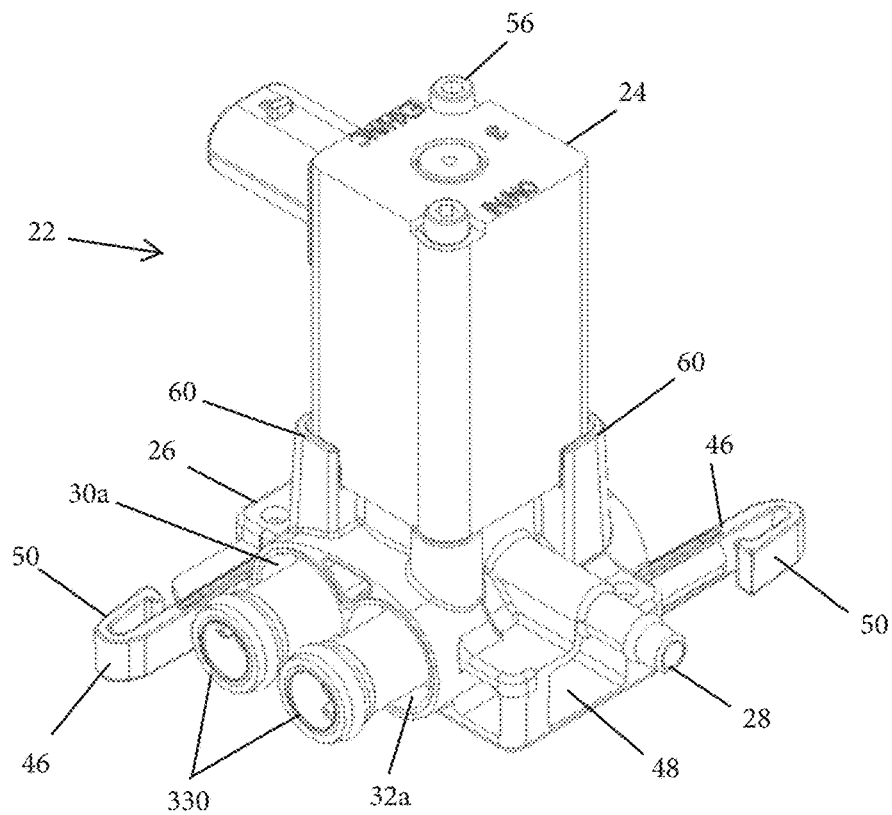
FIG. 2A is a perspective view of an embodiment of a two-way modular valve as used in the modular valve assembly of FIG. 1.
Figure 2B:
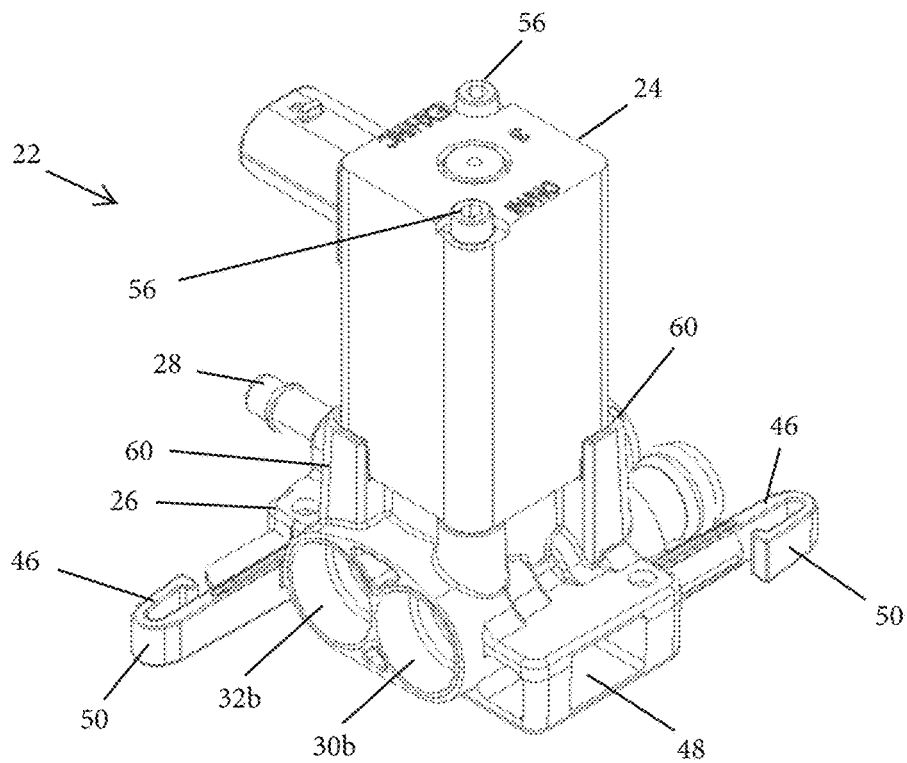
FIG. 2B is an opposite side perspective view of the valve base of the modular valve of FIG. 2A with the solenoid valve rotated 180 degrees.
Figure 2C:
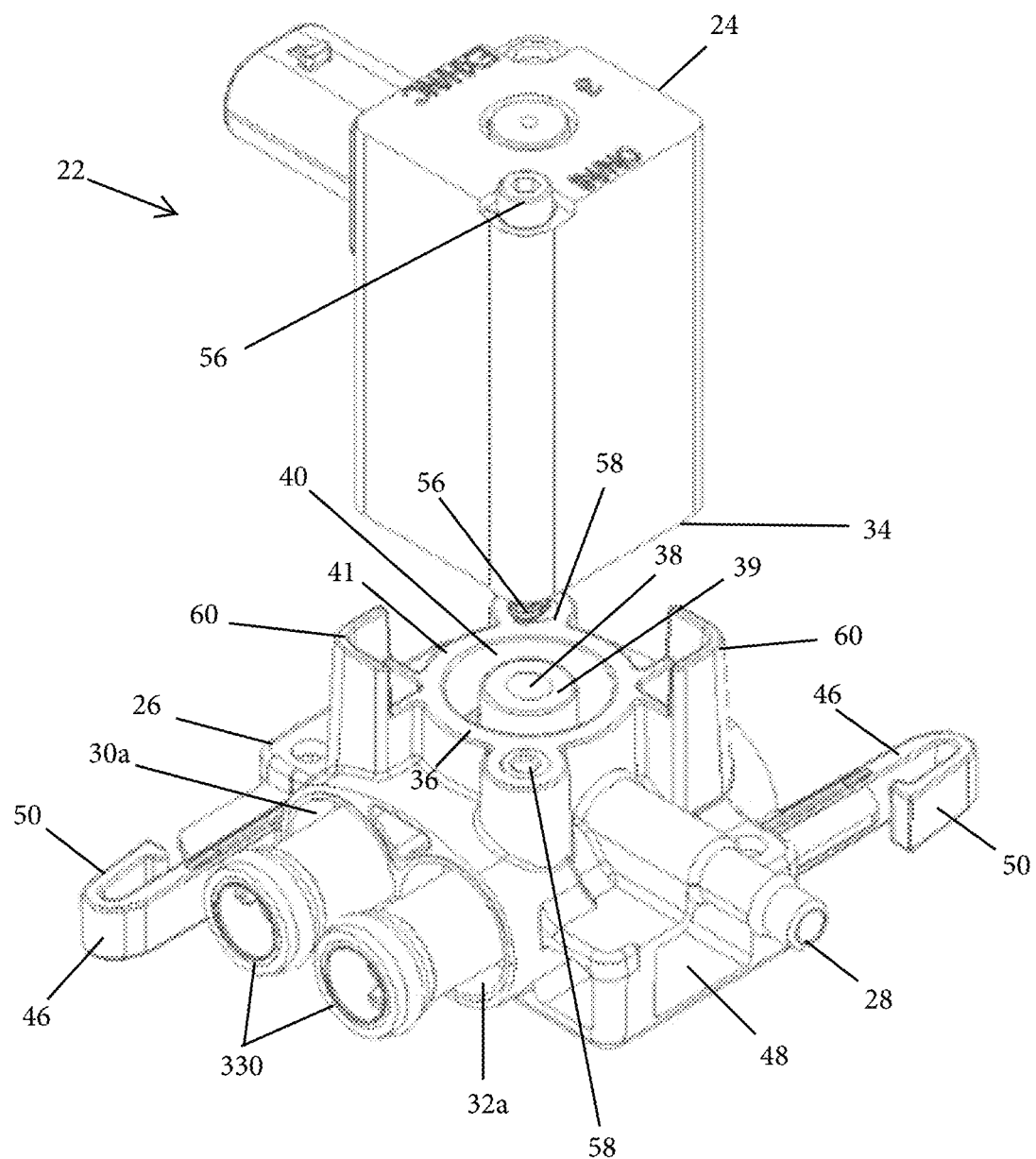
FIG. 2C is an upper exploded perspective view of the modular valve of FIG. 2A.
Figure 2D:
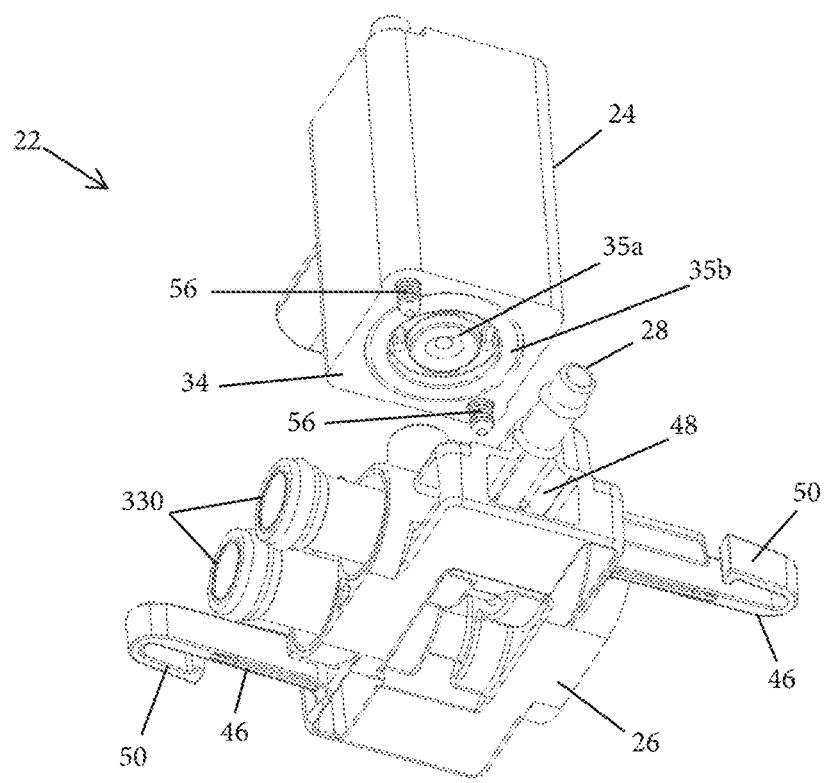
FIG. 2D is a lower exploded perspective view of the modular valve of FIG. 2A.
Figure 2E:
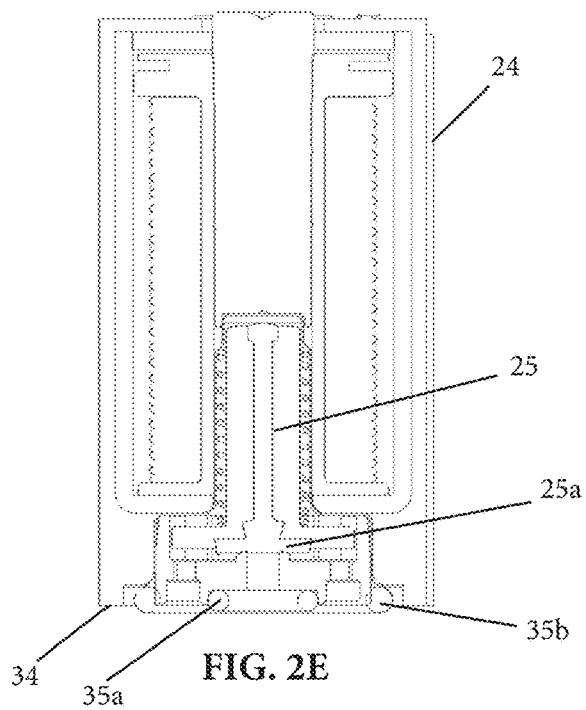
FIG. 2E is a side sectional view through the actuator of the modular valve of FIG. 2A.
Figure 3:
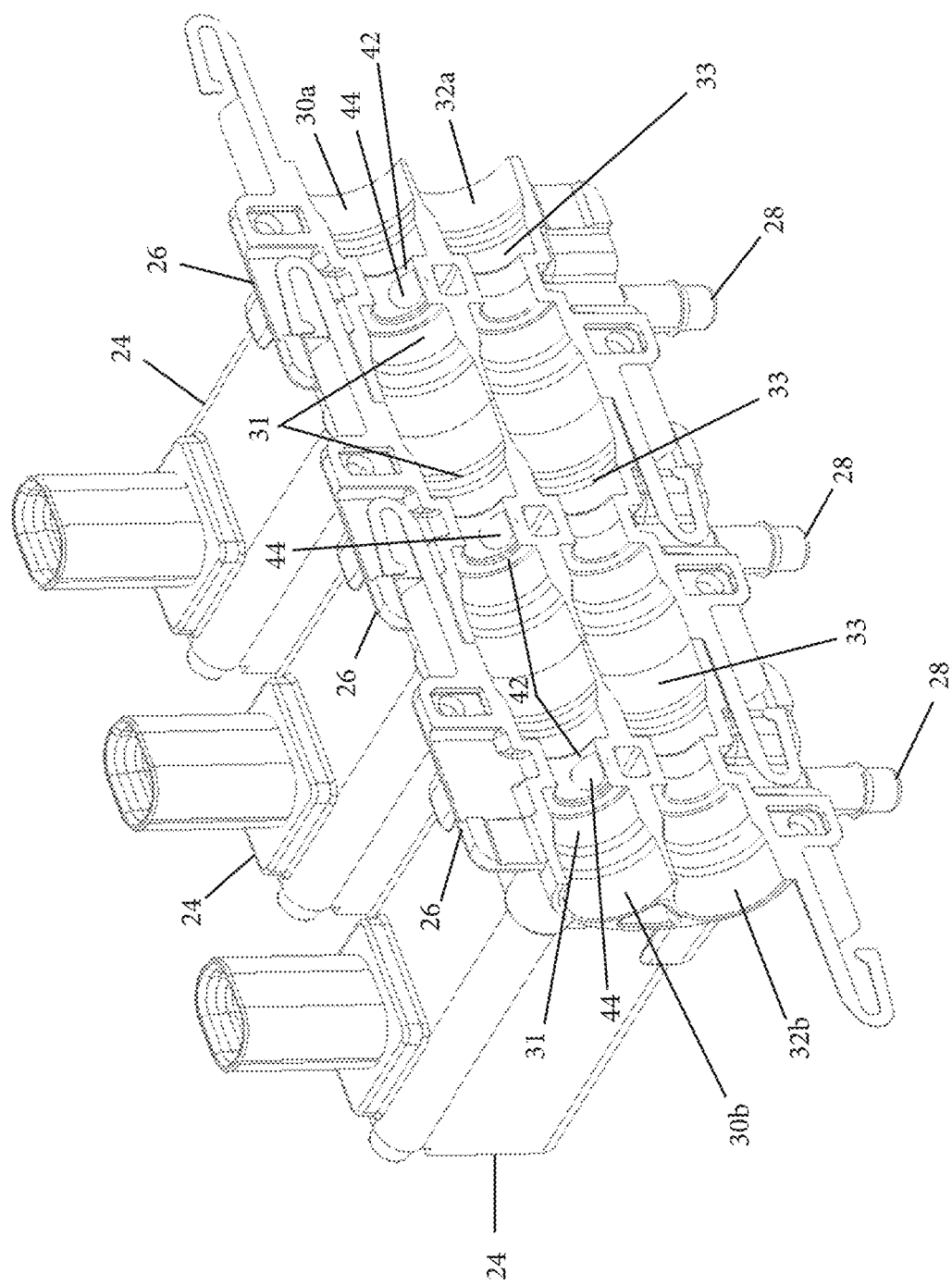
FIG. 3 is a cross sectional perspective view sectioned along the valve bases of the modular valve assembly of FIG. 1 with the end connectors removed for clarity.
Figure 4:
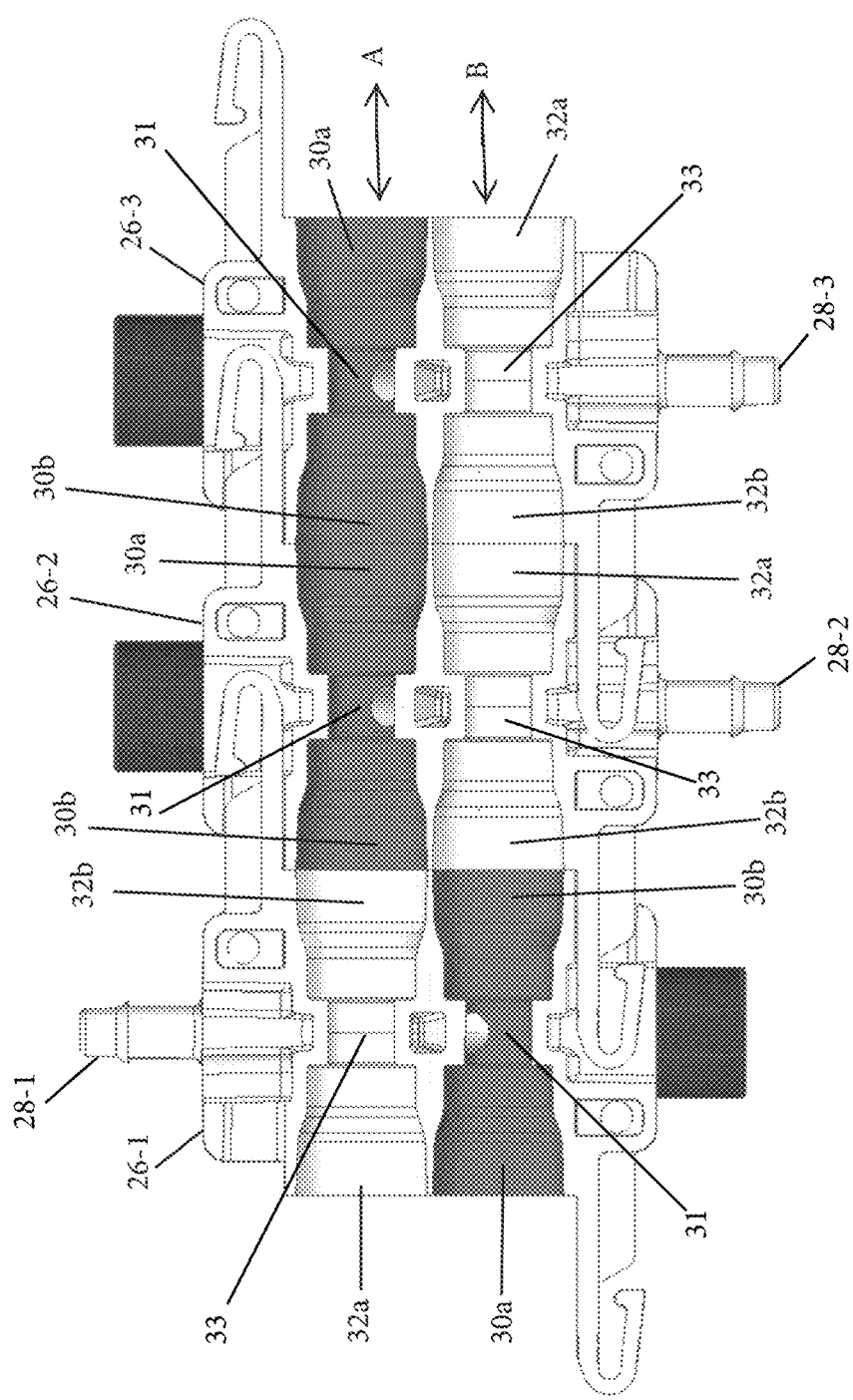
FIG. 4 is a cross sectional bottom plan view of the valve bases of the modular valve assembly of FIG. 3 with one of the modular valves shown connected in a 180 degree orientation from that of FIG. 3.

With reference to the embodiment of FIGS. 1-4, a modular valve assembly 20 is constructed by coupling together a plurality of modular valves 22a-c. As illustrated in FIGS. 1-2C, an exemplary modular valve 22 comprises an actuator or solenoid valve 24, which in the illustrated embodiment comprises an electronic actuator or solenoid that is coupled to a valve base or sub-base or valve body 26. Each valve base 26 includes a barbed side port 28, and pairs of complementary end ports 30a, 32a and 30b, 32b arranged on the connectable ends of the valve base 26. As illustrated in FIG. 3, channels or passages 31, 33 extend through valve base 26, with channel 31 extending between ports 30a, 30b and channel 33 extending between ports 32a, 32b. Of note is that the valve bases 26 may be connected together with the ports 30a, 32a of one valve base 26 being connected to ports 30b, 32b, respectively, of another adjacent valve base 26, or reversibly alternatively with one base 26 being rotated 180 degrees relative to the adjacent valves 26, ports 30a, 32a of one valve base 26 may be connected to ports 32a, 30a, respectively, of another valve base. That is, the valve bases 26 may be connected together in varying port connected arrangements to control the input/output of fluids flowing through channels 31, 32 and the discharging of the fluids from the valves 22.

As understood from FIG. 2C, a lower end 34 of solenoid valve 24 mates with a top side 36 of valve body 26, where top side 36 includes a central opening 38 surrounded by a sealing face 39 and an outer opening 40 surrounded by a sealing face 41. Outer opening 40 is fluidly connected with side port 28. Central opening 38 in turn is fluidly connected via an internal passage with opening 42 in channel 31. As understood from FIG. 2E, the solenoid valve 24 actuates an internal valve member 25 that selectively enables or prevents flow between the openings 38 and 40. In the illustrated embodiment valve member 25 is shown in a closed position to seal against internal seal 25a to thereby block flow between openings 38 and 40. When valve member 25 is raised from seal 25a, fluid can flow there between. As understood from FIGS. 2D and 2E, lower end 34 of solenoid valve 24 includes an inner O-ring 35a for sealing against sealing face 39 and includes an outer O-ring 35b for sealing against sealing face 41. Lower end 34 is open in the space between the outer periphery of inner O-ring 35a and the inner diameter of outer O-ring 35b to permit flow. It should thus be appreciated that flow within channel 31 may be selectively discharged out of port 28 when fluid is allowed to flow out of opening 38 and into opening 40 via actuator 24. Of course, the flow may be reversed as well. Still further, although actuator 24 in the illustrated embodiment is an electric actuator, it should be appreciated that non-electric actuators may be employed within the scope of the present invention, including pneumatic, manual or other such actuators.

As noted above, the end ports 30a, 30b and 32a, 32b are configured for connecting individual modular valves 22 together. This is illustrated in FIG. 1, where modular valve 22b is coupled to modular valve 22c. In the illustrated embodiment the end ports 30*a*, 30*b* and 32*a*, 32*b* are configured for adjoining or connecting via expandable seals 330. As shown in FIG. 1, modular valve 22*a* includes a pair of expandable seals 330, where two such seals 330 are used to sealingly join adjacent valves 22. The construction and operation of expandable seals 330 is discussed in detail below, along with the geometry of channels 31, 33 and in particular end ports 30*a*, 30*b* and 32*a*, 32*b* with respect to expandable seals 330. It should be appreciated that seals 330 are not shown in FIGS. 3 and 4 for ease of explanation of the construction and operation of modular valves 22.

As noted and illustrated in FIG. 3, each channel 31 of the valve bases 26 includes an internal passage 44 extending upwards from opening 42, where passage 44 connects for selective flow with side ports 28 as controlled by the internal valve member 25 that is actuated for movement via solenoid valve 24. In contrast, each channel 33 of the valve bases 26 provides for flow through the valve base 26 without connection to the passage 44. As shown in FIG. 3, each of valve bases 26 are connected together whereby channels 31 are aligned. As shown in the alternative arrangement of FIG. 4, however, the left most valve base 26-1 is rotated or oriented so as to be 180 degrees turned relative to the other two valve bases 26-2 and 26-3. As such, flow in either direction along flow path A will only have the possibility of being output at ports 28-2 and 28-3 and will flow through valve base 26-1, and flow in either direction along flow path B will only have the possibility of being output at port 28-1 and will flow through valve bases 26-2 and 26-3.

Figure 5A:
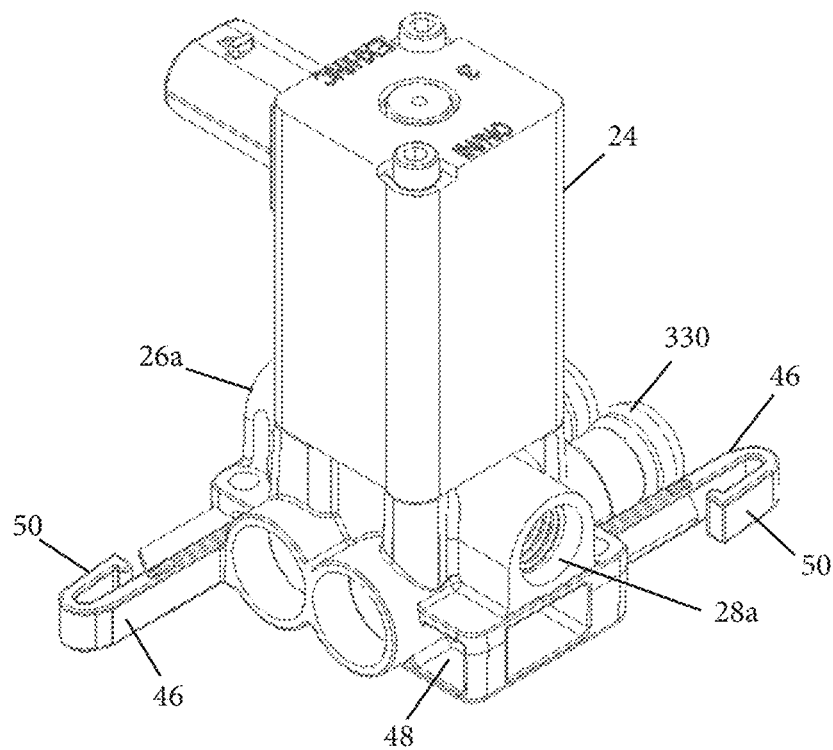
FIGS. 5A and 5B disclose a modular valve in accordance with the present invention having an alternative valve base configuration.
Figure 5B:
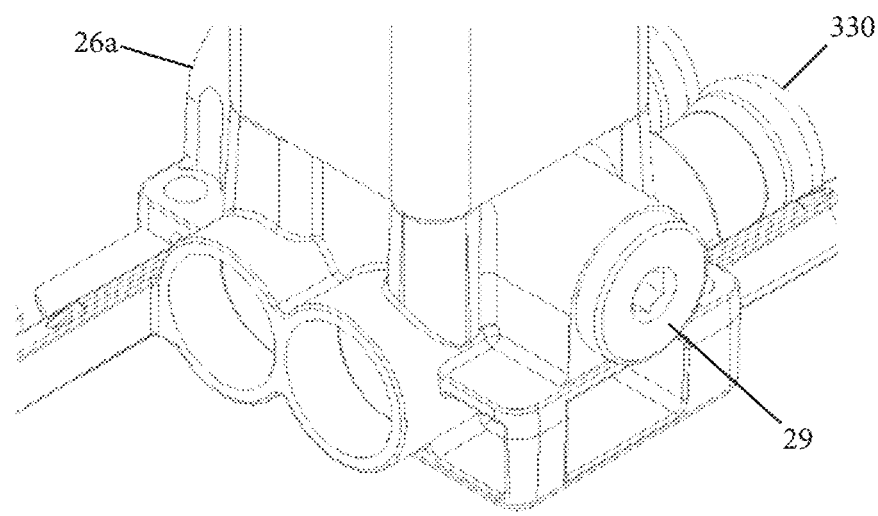

In the illustrated embodiment of FIGS. 1-4, the side ports 28 comprise a single extending barbed side ports 28 to which a tube or line may be connected. It should be appreciated, however, that alternatively arranged and/or configured side ports. For example, each valve base may be configured to include a pair of side ports on opposite sides of the valve base, where each such side port may be an extending barbed side port that is similarly constructed as barbed side port 28. Still further, alternative side ports may be constructed as internally or externally threaded ports, for example. For example, FIGS. 5A and 5B disclose an alternatively configured valve base 26*a* having a threaded side port 28*a* with an internal thread, where side port 28*a* would be in fluid communication with the internal space at opening 40 as discussed above. Valve base 26*a* may include threaded side ports 28*a* on one or both sides of valve base 26*a*, and as shown in FIG. 5B may be selectively plugged with a threaded cap 29 as desired for a particular configuration and operation.

In the illustrated embodiment fluid is provided as an input to channels 31, 33 via end ports 30*a*, 30*b* or 32*a*, 32*b*, with output fluid flow through or out of selected side ports 28, depending on the selected configuration of the connection of the valve bases 26. That is, due to the ability of the valve bases 26 to be reversibly oriented, the flow out of a given valve body 26 may be selectively controlled. Accordingly, two separate fluids may be input to the modular valve assembly 20 where a series of arranged channels 31, 33 will make up a first manifold or fluid passage A through the modular valve assembly 20 and the opposite series of arranged channels 31, 33 will make up a second manifold fluid passage B through the modular valve assembly 20. For example, a gas may be passed through passage A while a liquid is passed through passage B.

Accordingly, the selective orientation of the valve bases 26 allows for the selective orientation of channel 31 and output through the corresponding outlet port 28. When the solenoid valve 24 of a modular valve 22 actuates the valve member, the fluid passing through the corresponding channel 31 is then passed to the selected outlet port 28. Such an embodiment allows for flexible arrangement of multiple modular valves 22 of the same design in forming a variety of different valve assembly embodiments.

As also illustrated in FIGS. 1-4, each valve base 26 includes a pair of connectors, which in the illustrated embodiment are configured as barbs or retaining arms or legs 46, and a pair of complementary retaining receptacles 48. Each receptacle 48 is paired with a retaining leg 46, with the legs 46 and receptacles 48 being on opposed corners so as to allow the reversible connection of the valve bases 26. As shown in the illustrated embodiment, the legs 46 include a hook portion 50 for engagement into and with the receptacle 48 of a valve base 26 of an adjacent modular valve 22. Thus, as illustrated in FIG. 1, a retaining receptacle 48 of a first valve base 26 securely mates with a corresponding retaining leg 46 of a second valve base 26. It should be appreciated that alternative connection configurations may be employed for connecting valve bases 26 together, such as a threaded or quick connect connection, as well as alternatively configured legs and receptacles.

Endcaps or end connectors 52 may be arranged on one or both of the end most valve bases 26 at the ends of the modular valve assembly 20 for connecting with the exposed end ports 30*a*, 32*a* or 30*b*, 32*b*. In the illustrated embodiment of FIG. 1, an endcap 52 is provided on the valve base 26 of modular valve 22*c* and an endcap 52 is correspondingly provided on the valve base 26 of modular valve 22*a*. Endcaps 52 include a barbed port 54 aligned with one of the flow paths A or B through the valve assembly 20, with each barbed port 54 configured to receive a tube or line such as to supply a fluid (gas or liquid) into valve assembly 20. For example, endcap 52 connected to modular valve 22*c* is aligned with one flow path through valve assembly 20 and endcap 52 connected to modular valve 22*a* is aligned with the other flow path through valve assembly 20. Each endcap 52 correspondingly blocks the adjacent end port of the valve base 26 that is not aligned with the barbed port 54 of endcap 52. Endcaps 52 are sealingly joined to the respective valve bases 26 via expandable seals 330.

In the illustrated embodiment the solenoid valves 24 comprise solenoids supplied by Humphrey Products of Kalamazoo, Mich. As shown, solenoid valves 24 are secured to valve bases 26 via fasteners 56, where fasteners 56 engage with bores 58 (FIG. 2C) of valve body 26. Valve bodies 26 are additionally constructed with upward extending retainers 60 for use in aligning solenoid valves 24 to top side 36 of valve bodies 26 during assembly. It should be appreciated that alternative actuators may be employed within the scope of the present invention including, for example, fluid operated actuators. Also in the illustrated embodiment the valve bases 26 are formed of plastic, such as molded plastic. Alternatively, the valve bases 26 may be formed of a metal or metal alloy, such as a molded or machined metal or metal alloy.

Figure 6:
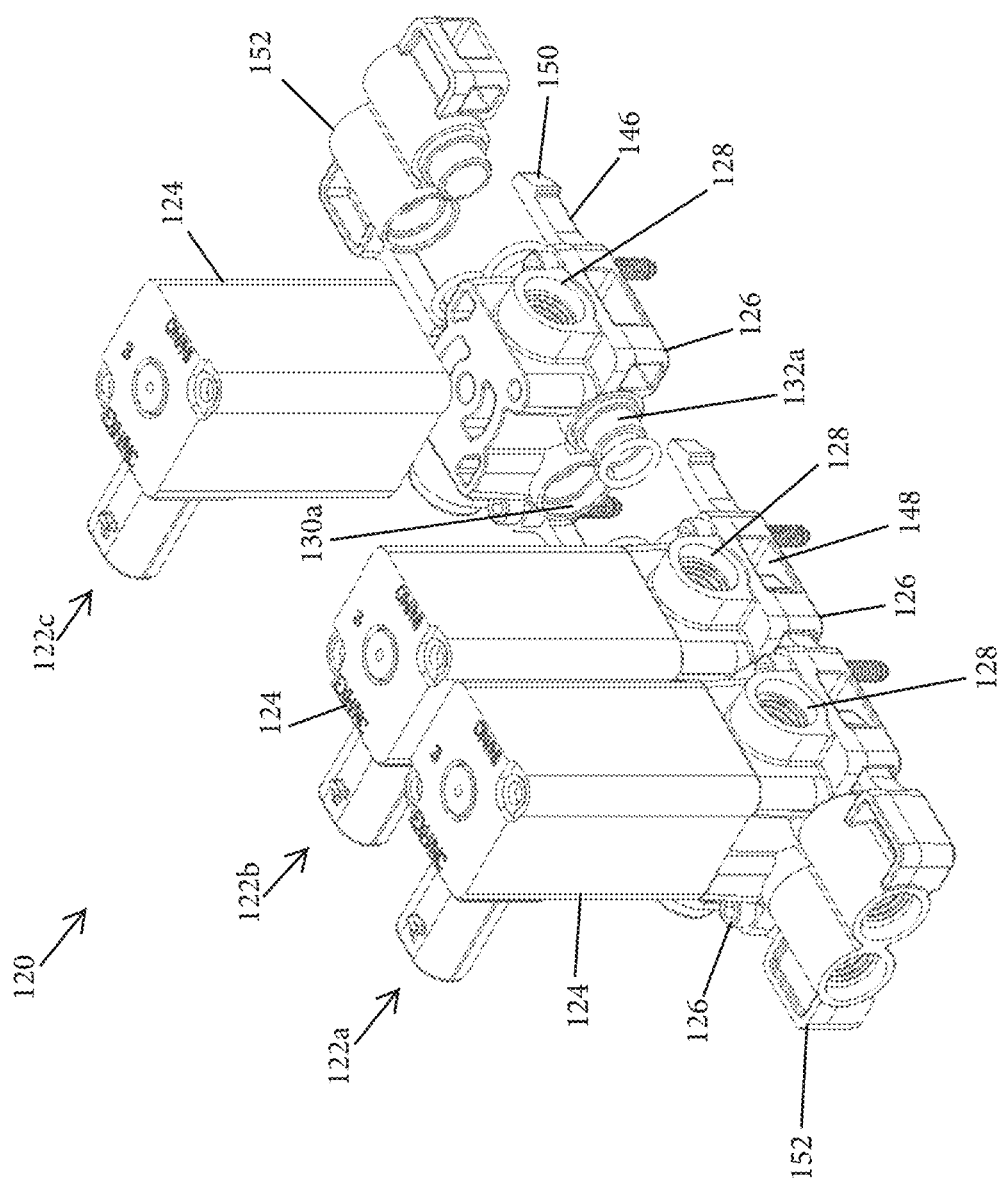
FIG. 6 is a perspective view of another embodiment of a two-way modular valve assembly in accordance with the present invention with one of the modular valves shown disconnected.
Figure 7:
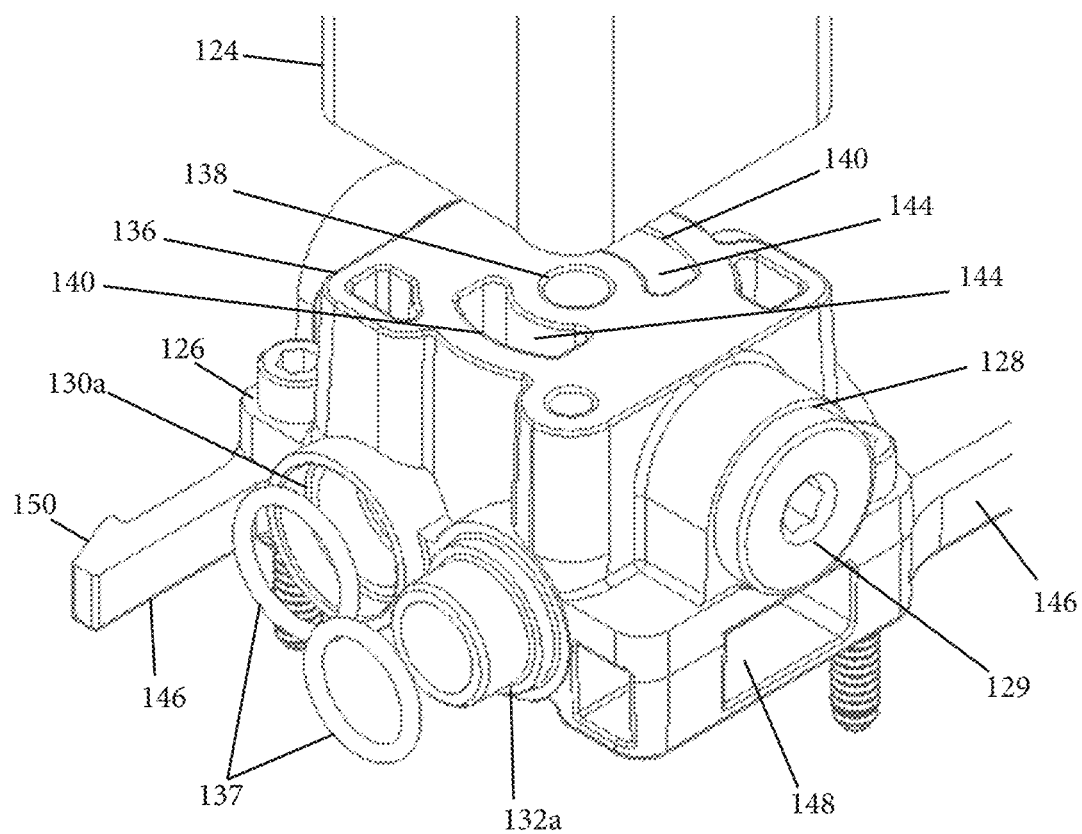
FIG. 7 is an exploded perspective view of an embodiment of a two-way modular valve as used in the two-way modular valve assembly of FIG. 6.
Figure 8:
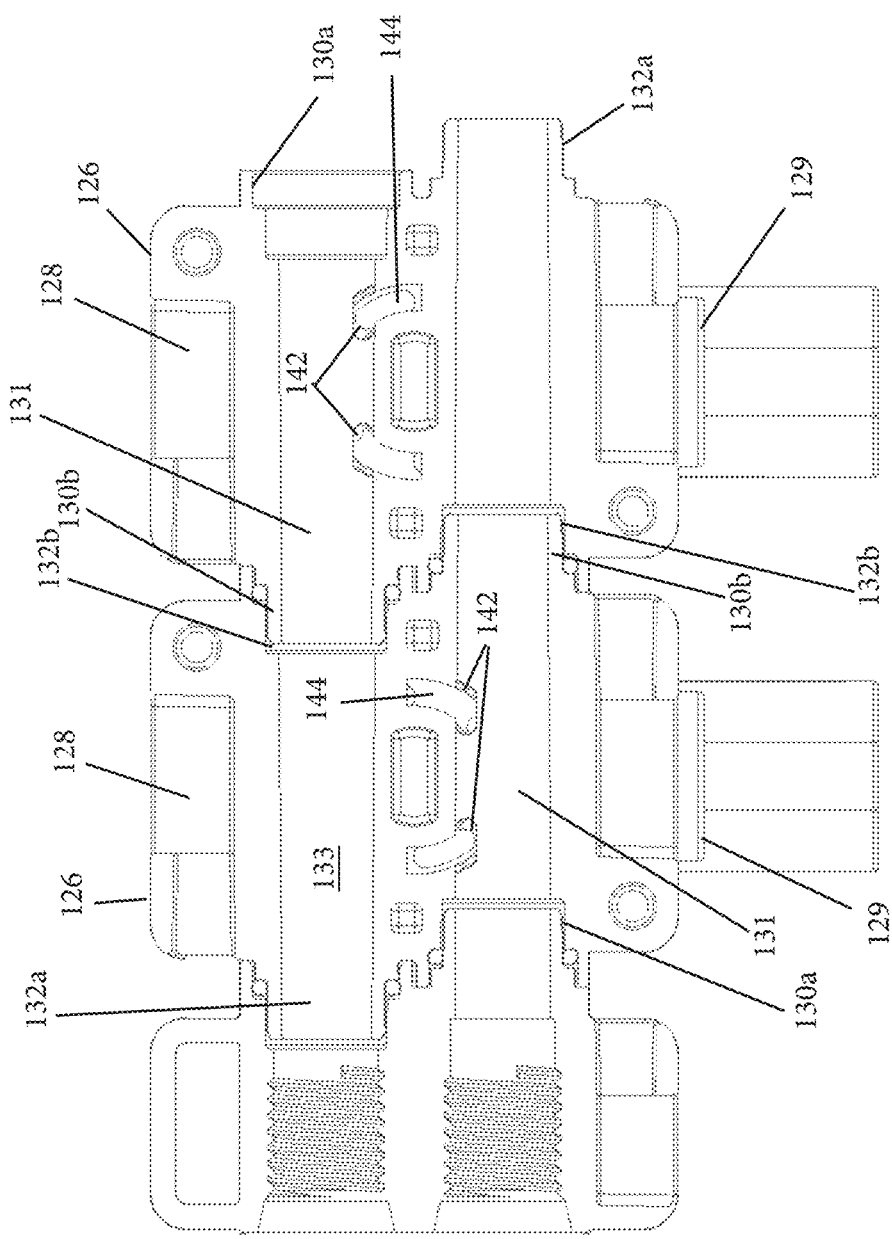
FIG. 8 is a cross sectional view of the valve bases of the two-way modular valve assembly of FIG. 6.

An alternative modular valve assembly 120 is illustrated in the embodiment of FIGS. 6-8, where valve assembly 120 is of similar construction and operation to valve assembly 20, where the similar components and features of valve assembly 120 relative to valve assembly 20 are identified with similar reference numerals to which 100 is added to the reference numerals of valve assembly 20. Due to the similarities of modular valve assembly 120 with modular valve assembly 20, not all of the like components and features of valve assembly 120 are discussed herein.

As shown in FIGS. 6-8, a plurality of modular valves 122a-c are coupled together to form modular valve assembly 120, where each modular valve 122 comprises an actuator 124 that is coupled to a valve base or sub-base or valve body 126. As illustrated, each valve base 126 includes a pair of opposed side ports 128, and pairs of complementary end ports 130a, 130b and 132a, 132b arranged on the connectable ends of the valve base 126. As illustrated in FIG. 8, channels or passages 131, 133 extend through valve base 126, with channel 131 extending between ports 130a, 130b and channel 133 extending between ports 132a, 132b.

As with modular valves 22 above, the valve bases 126 may be connected together with the ports 130b, 132b of one valve base 126 being connected to ports 130a, 132a, respectively, of another valve base 126, or reversibly alternatively, ports 130b, 132b of one valve base 120 may be connected to ports 132b, 130b, respectively, of another valve base. That is, the valve bases 126 may be connected together in varying port connected arrangements to control the input/output of fluids flowing through channels 131, 133 and the discharging of the fluids from the valves 122.

As noted above, the end ports 130a, 130b and 132a, 132b are configured for connecting individual modular valves 122 together. This is illustrated in FIG. 6, where modular valve 122a is coupled to modular valve 122b. In the illustrated embodiment the end ports 130a, 130b and 132a, 132b are configured for quick connect/disconnect, with ports 130a, 132b configured as female ports and ports 132a, 130b configured as male ports, and with seals, such as O-rings 137 as illustrated, disposed on the outwardly extending tube portions of the male ports for sealing with an internal diameter of the female ports.

As illustrated in FIG. 8, each channel 131 of the valve bases 126 includes an internal opening or openings 142 at passage or passages 144, where passages 144 connect for selective flow with side ports 128 as controlled by the valve member 25 that is actuated for movement within valve actuator 124. For example, passages 144 extend through valve base 126 to form openings 140 on top side 136 of valve base 126. In turn, central opening 138 intersects with or leads to side ports 128 (see FIG. 7). In contrast, each channel 133 of the valve bases 126 provides for flow through the valve base 126 without connection to the valve bore 144 and valve member 25.

As illustrated in FIG. 7, selected ones of the side ports 128 of each valve base 126 may be selectively closed off by way of plug or cap 129 to prevent flow through that particular side port 128, whereby flow may then only be through the opposite side port 128. In the illustrated embodiment, the side ports 128 comprise internally threaded ports that may receive a threaded plug 129. For example, the side ports may be SAE #2 ports. It should be appreciated that alternative forms of side ports 128 may be utilized, as well as alternative plugs or caps therewith.

In the illustrated embodiment fluid is provided as an input to channels 131, 133 via end ports 130a, 130b or 132a, 132b, with output fluid flow through or out of selected side ports 128, depending on the selected configuration of the connection of the valve bases 126 and the use of plugs 129. That is, due to the ability of the valve bases 126 to be reversibly oriented, the flow out of a given valve body 126 may be selectively controlled. Accordingly, two separate fluids may be input to the modular valve assembly 120 where a series of arranged channels 131, 133 will make up a first manifold or fluid passage A through the modular valve assembly 120 and the opposite series of arranged channels 131, 133 will make up a second manifold fluid passage B through the modular valve assembly 120. For example, a gas may be passed through passage A while a liquid is passed through passage B.

Accordingly, as illustrated in FIGS. 6-8, in combination with selectively closing off ones of the outlet ports 128 with a plug 129, an orientation of the valve base 126 allows for the selective orientation of channel 131 and output through the corresponding outlet port 128. When the solenoid 124 of a modular valve 122 actuates the valve member 25, the fluid passing through the corresponding channel 131 is then passed to the selected outlet port 128. Such an embodiment allows for flexible arrangement of multiple modular valves 122 of the same design in forming a variety of different valve assembly embodiments.

As illustrated in FIGS. 6 and 7, each valve base 126 includes a pair of connectors, which in the illustrated embodiment are configured as barbs or retaining arms or legs 146, and a pair of complementary retaining receptacles 148. Each receptacle 148 is paired with a retaining leg 146, with the legs 146 and receptacles 148 being on opposed corners so as to allow the reversible connection of the valve bases 126. As shown in the illustrated embodiment, the legs 146 include a hook portion 150 for engagement into and with the receptacle 148.

Endcaps 152 may be arranged on the exposed valve base 126 ends of the modular valve assembly 120 for connecting with the exposed end ports 130a, 130b or 132a, 132b. As understood from FIG. 6, endcaps 152 include a pair of channels each of which includes internal threads in the illustrated embodiment whereby a fluid line with an external thread fitting may be provided or a threaded plug may be used to cap the assembly 120. For example, a fluid supply line may be provided to a channel of the endcap 152 associated with the first fluid passage A at one end of the modular valve assembly 120, and a plug at the corresponding channel of the opposite endcap 152 associated with the first fluid passage. As also illustrated in FIG. 6, each endcap 152 includes a receptacle 148 and a retaining leg 146 so as to securely mate with the corresponding retaining leg 146 and receptacle 148 of the valve base 126 to which the endcap 152 is coupled. Seals, such as O-rings, are also used with the endcaps 152. It should be appreciated that alternative endcaps may be employed, such as, for example, push to connect fittings enabling hoses or lines to be pressed therein for connection.

With reference to the embodiment of FIGS. 9-17B, an alternative modular valve assembly 200 is illustrated, where a plurality of three-way modular valves 202a-f are coupled together to form a three-way modular valve assembly 200. Modular valve assembly 200 shares certain components and features of modular valve assemblies 20 and 120 discussed above.

Figure 9:
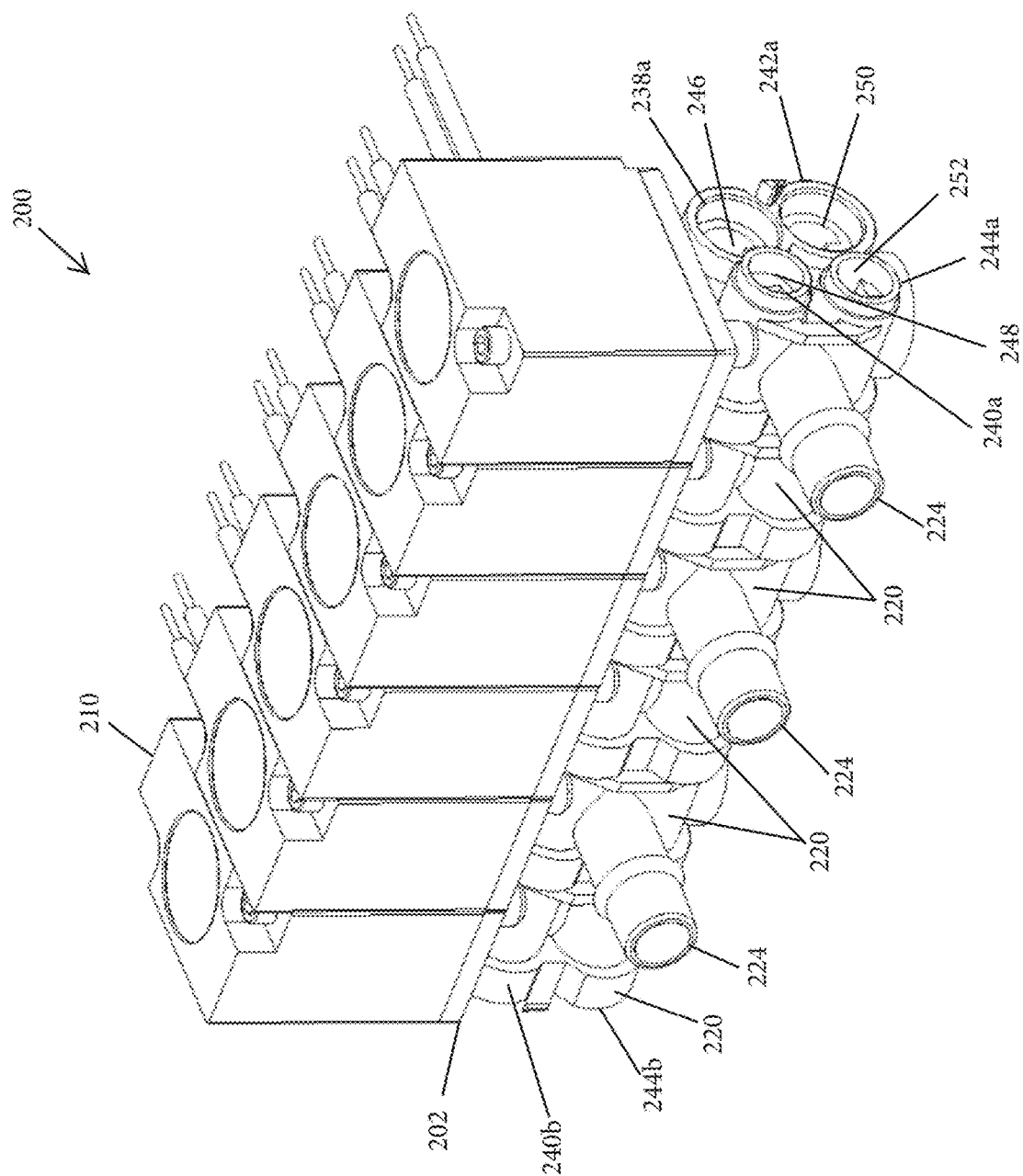
FIG. 9 is a perspective view of another embodiment of a modular valve assembly in accordance with the present invention showing a three-way modular valve assembly.

As illustrated in FIG. 9, each modular valve 202 comprises an actuator 210, which in the illustrated embodiment comprise solenoids, and include a valve base 220. The exemplary arrangement of the modular valve assembly 200 illustrated in FIG. 9 includes arranging the valve bases 220, such that each valve base 220 is reversed relative to the adjacent valve bases 220 on either side. Three side ports 224 for three of the valve bases 220 are thus shown in FIG. 9, while the side ports 224 for the other three valve bases 220 are oriented to be directed extending from the opposite side of modular valve assembly 200.

As understood from FIGS. 9 and 15A-17B, each valve base 220 includes four end ports 238a, 240a, 242a, 244a on one end of the valve base 220 that communicate with four end ports 238b, 240b, 242b, 244b, respectively, on the other end of the valve base 220. The respective ports are connected by channels 246, 248, 250 and 252. At one end, ports 238a and 242a comprise female ports and ports 240a and 244a comprise male ports, while at the opposite end ports 238b and 242b comprise male ports and ports 240b and 244b comprise female ports. Accordingly, in like manner to modular valves 22 and 122 discussed above, modular valves 202 may be interconnected together in end-to-end engagement, including with reversible orientations of selected ones of the modular valves 202 to provide alternative flow arrangements of the modular valve assembly 200. In the illustrated embodiment of valve bases 220 the end ports are configured as quick connect/disconnect couplers or couplings with seal rings allowing for rapidly and securely coupling the modular valves 202 together.

Figure 12A:
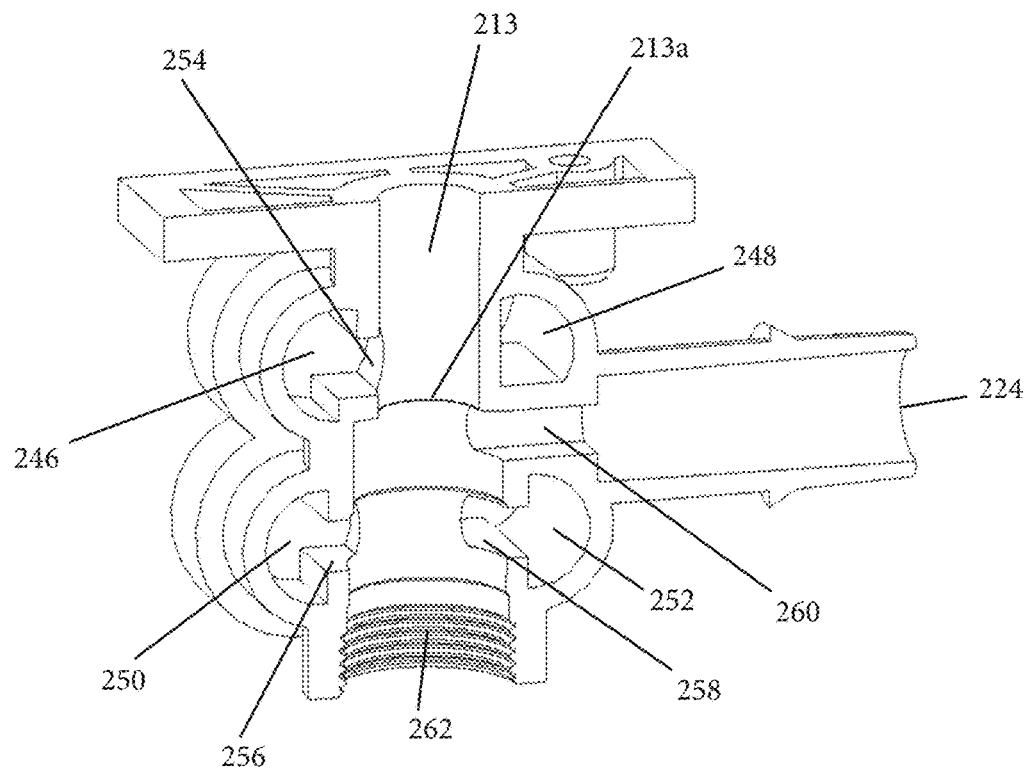
FIGS. 12A and 12B are opposing cross sectional views of a valve base of a three-way modular valve of the three-way modular valve assembly of FIG. 9.
Figure 12B:
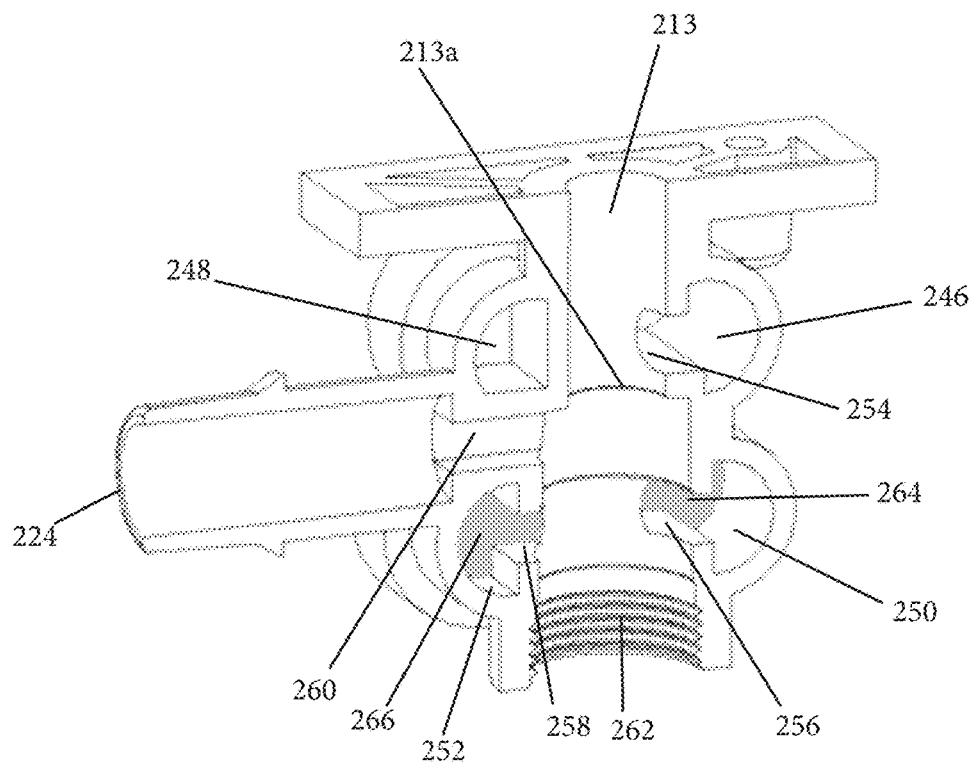

FIGS. 12A and 12B illustrate a cross section of a valve base 220 from opposite orientations. As there shown, a central valve bore 213 is provided within which a valve member 225 (FIG. 10) is actuated by actuator 210 to selectively control the flow through the valve base 220. As also shown, passages or apertures are provided between selected ones of the channels for fluid flow communication with the valve bore 213. This includes passage 254 connecting channel 246 with valve bore 213, passage 256 connecting passage 250 with valve bore 213, and passage 258 connecting channel 252 with valve bore 213. Channel 248, however, does not include a connection with valve bore 213 whereby flow through channel 248 of a given valve base 220 will bypass the valve bore 213 of that valve base 220. As further understood from FIGS. 12A and 12B, a passage 260 is provided in valve bore 213 for flow communication with side ports 224. Accordingly, via movement of the valve member 225 within the valve bore 213 various of the channels will be in fluid communication with the valve bore 213 and the side port 224. A bottom port 262 is also included on valve base 220, which in the illustrated embodiment is threaded, and may be used to receive a plug, which operates as a valve member stop 226.

FIG. 12B also illustrates that end walls 264, 266 are provided at channels 250, 252, respectively, with walls 264, 266 thus blocking flow beyond the channels 250, 252 in that direction, or into the channels 250, 252 from the opposite direction.

Figure 10:
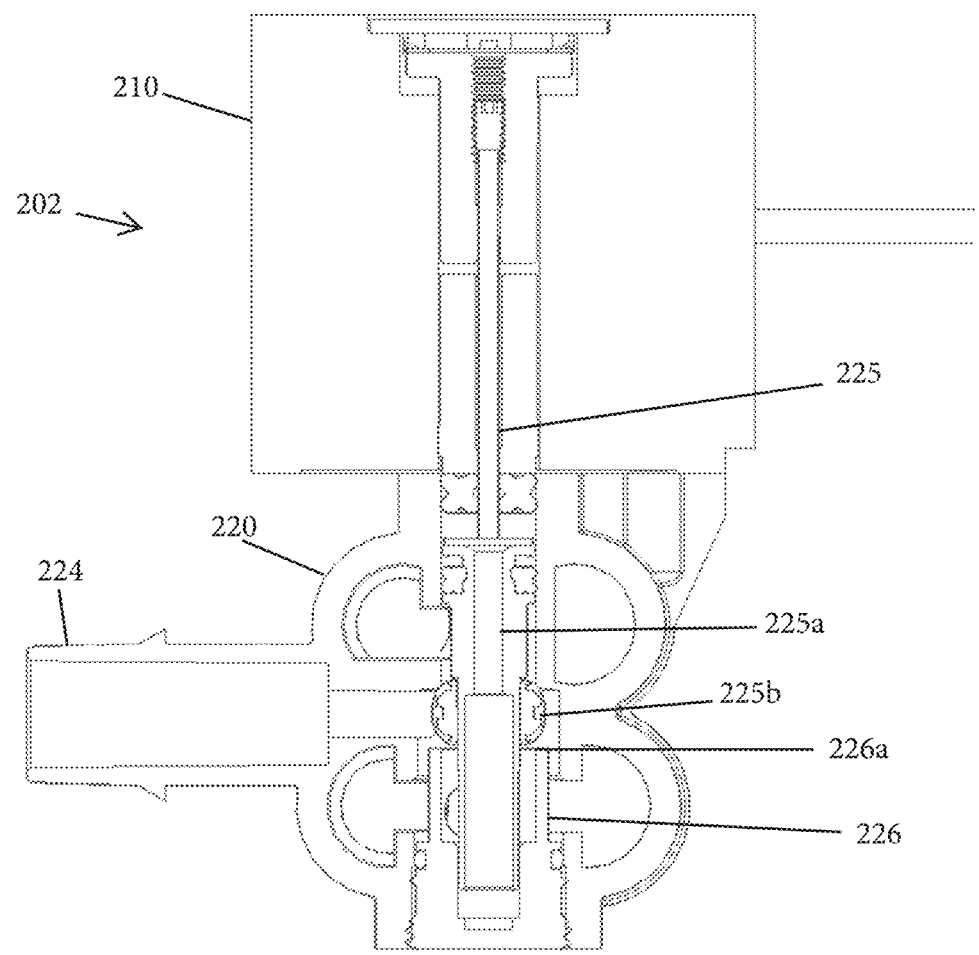
FIG. 10 is a cross-sectional view through a three-way modular valve of FIG. 9.
Figure 11A:
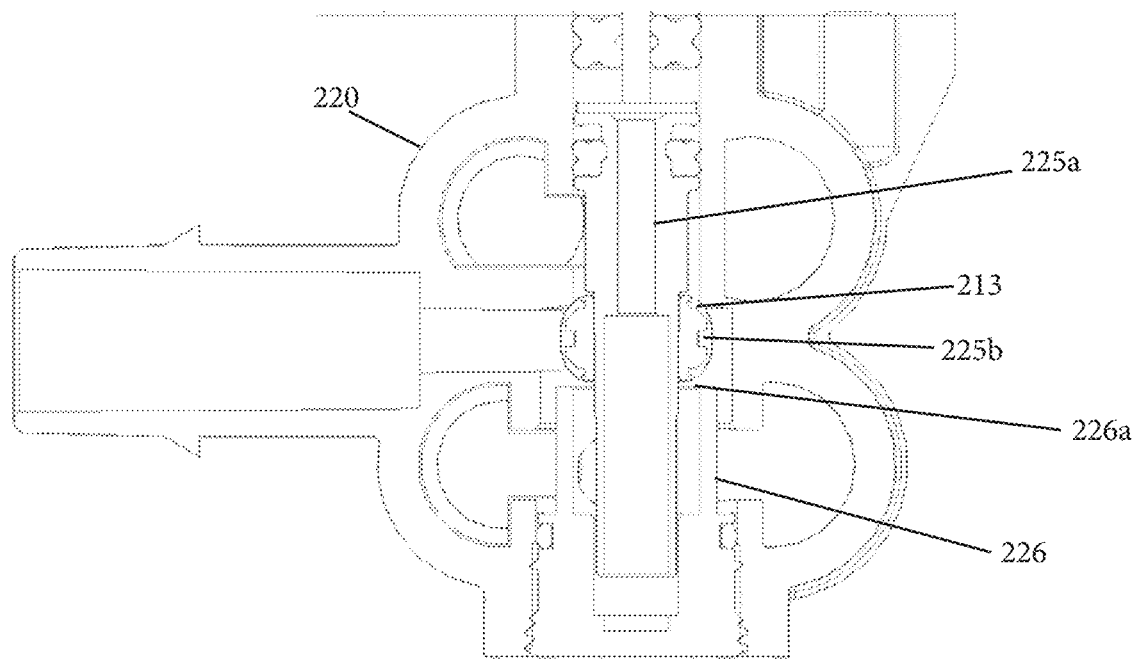
FIGS. 11A and 11B are cross-sectional views of the modular valve of FIG. 10 showing the valve member in two different positions.
Figure 11B:
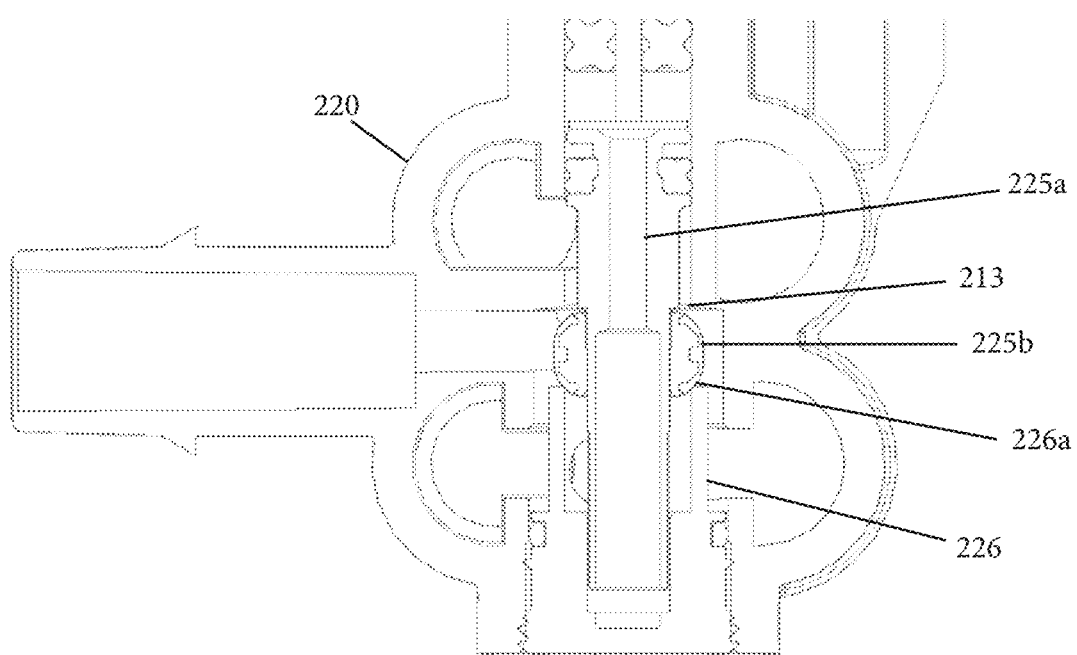

FIGS. 10, 11A and 11B illustrate the internal operation and sealing of valve base 220. As shown in FIG. 10, valve member 225 includes a stem 225a and a poppet 225b, where solenoid 210 operates to actuate valve member 225 within bore 213. FIG. 11A illustrates solenoid 210 in an un-energized orientation whereby valve member 225 is moved upward, such as via a spring force, whereby poppet 225b seals against internal sealing edge 213a of bore 213. FIG. 11B illustrates 210 in an energized orientation whereby valve member 225 is moved downward whereby poppet 225b seals against sealing edge 226a of stop 226.

Figure 13:
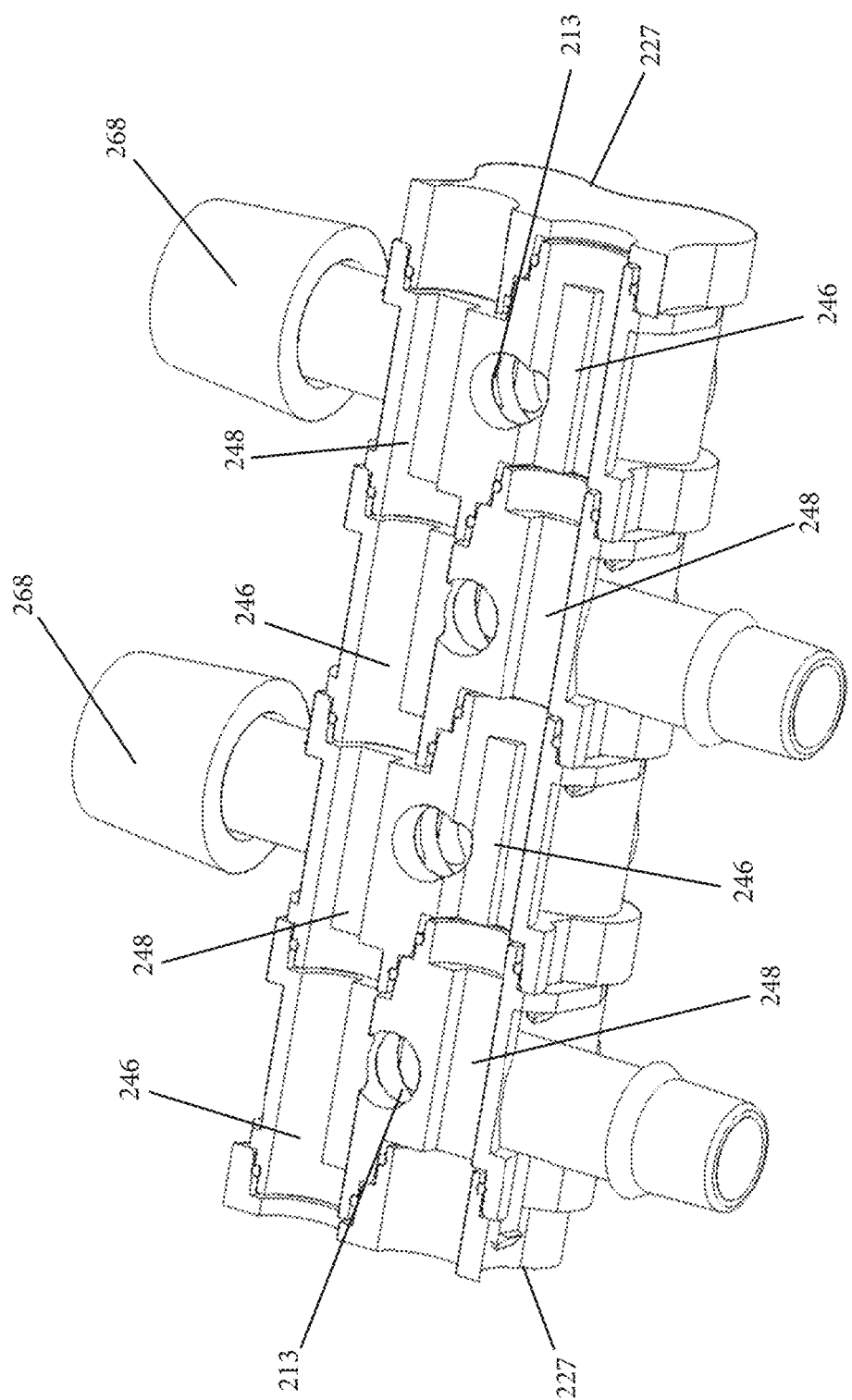
FIG. 13 is a cross sectional view of a portion of interconnected valve bases of the three-way modular valve assembly of FIG. 9.
Figure 14:
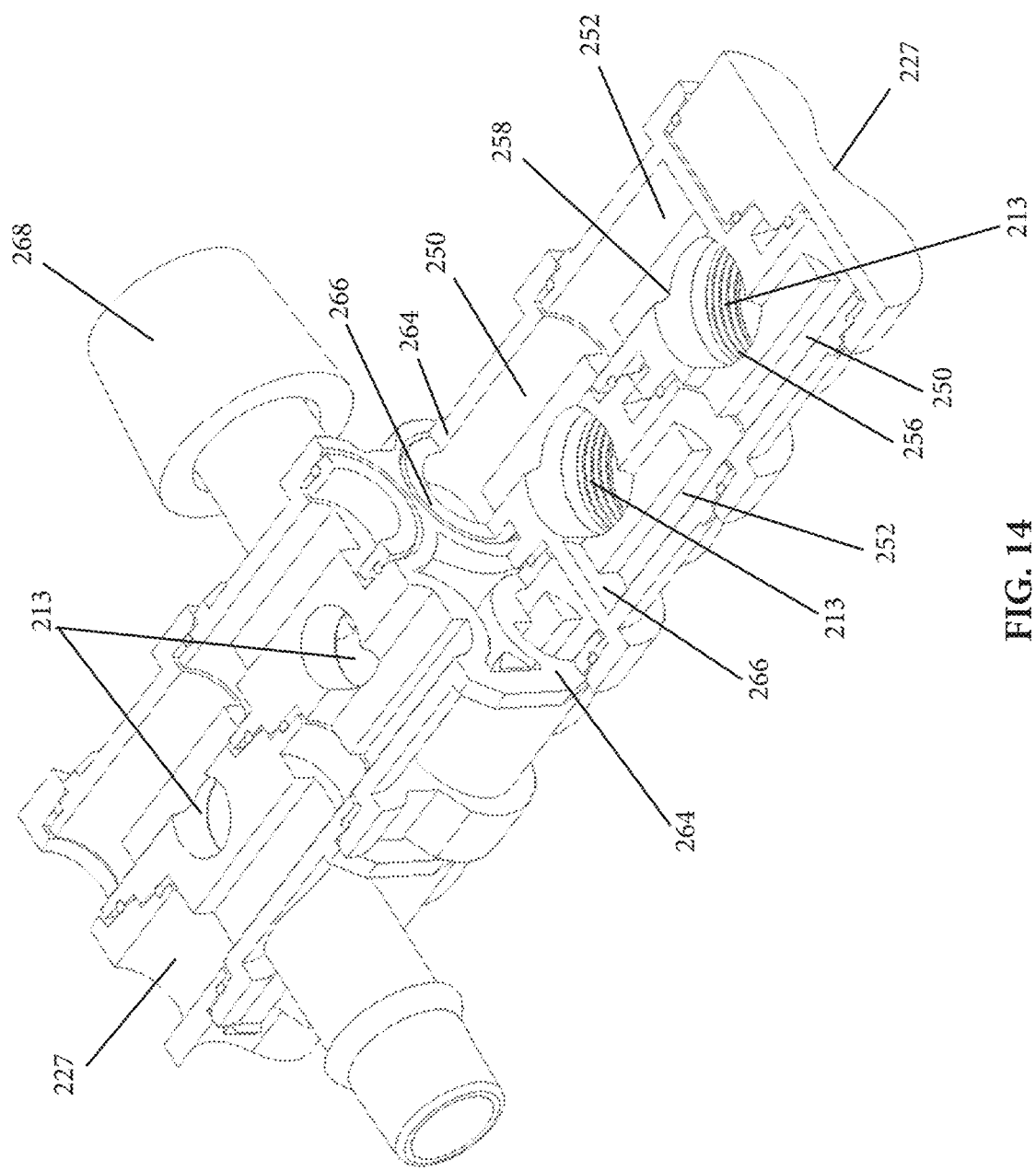
FIG. 14 is a cross sectional view of another portion of valve bases of the three-way modular valve assembly of FIG. 9 from an alternative perspective.

FIGS. 13 and 14 depict cross sections of a quartet of valve bases 220 connected together, with every other valve base 220 being in reverse orientation relative to its adjacent valve base 220. FIG. 13 illustrates a series of channels 248 and 246 in linear arrangement via the connection of valve bases 220 to form a pair of fluid passages or manifolds of a modular valve assembly. FIG. 14 illustrates the channel 252 of the right most valve base 220 being in fluid communication with channel 250 of the adjacent valve base 220, and correspondingly the channel 250 of the right most valve base 220 being in fluid communication with the channel 252 of the adjacent valve base 220. Also shown is the end walls 264 and 266 of the middle two valve bases 220 being in end-to-end abutment whereby flow is prevented between the valve bases along the respective lower pair of fluid passages or manifolds at that location. FIGS. 13 and 14 further depict caps 268 disposed over selected ports 224, as well as end caps 227 at respective ends of the modular valve assembly.

Figure 15A:
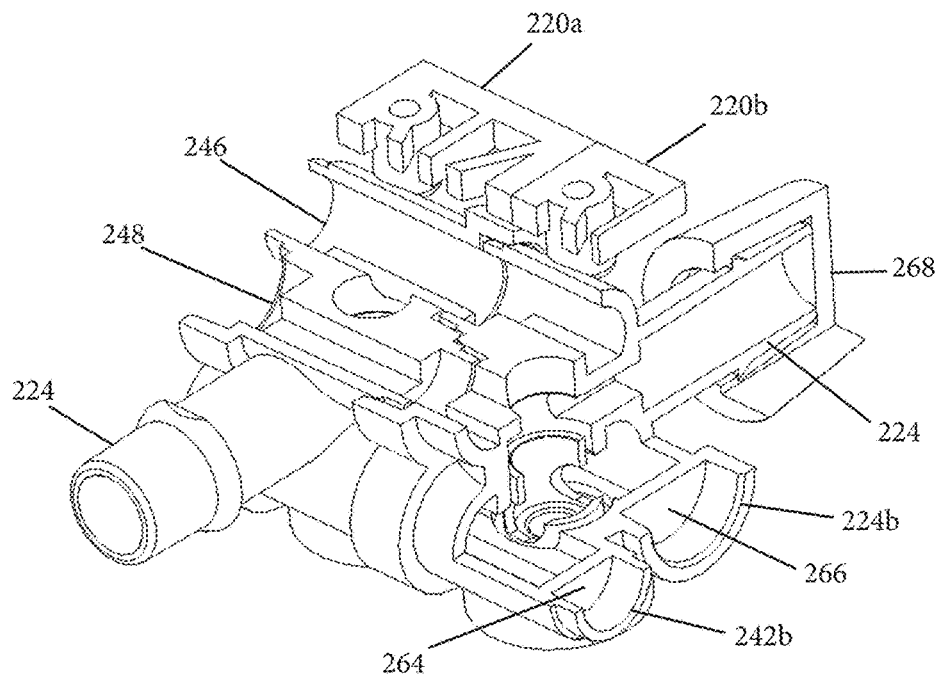
FIGS. 15A and 15B are sectional perspective views of portions of a pair of valve bases of the three-way modular valve assembly of FIG. 9 illustrating internal passages in a first flow communication orientation.
Figure 15B:
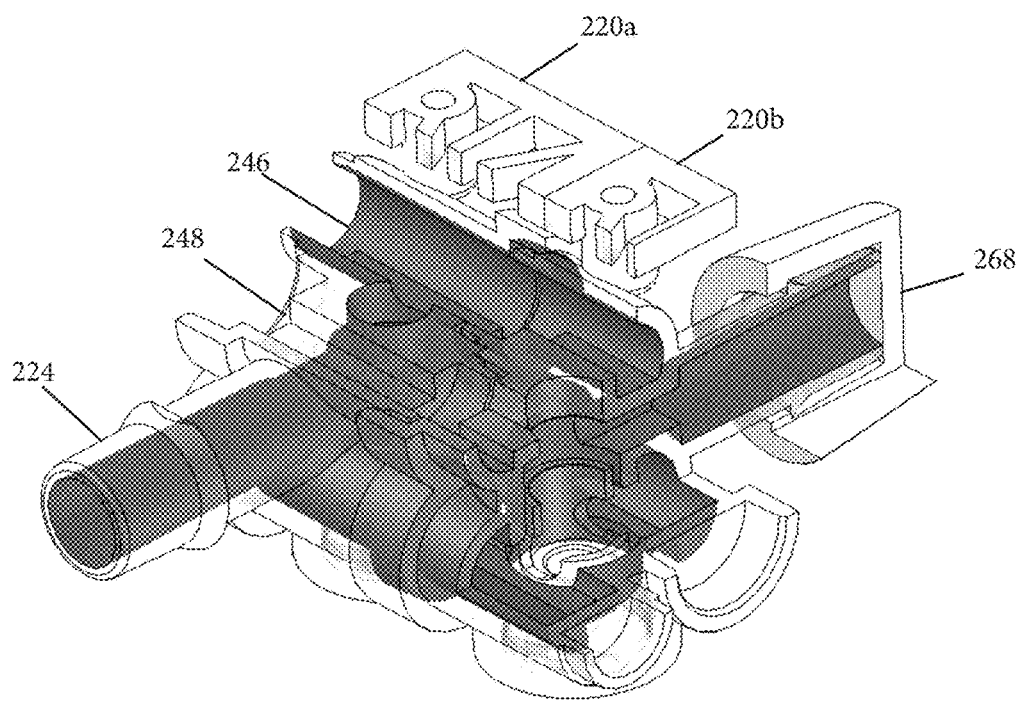
Figure 16A:
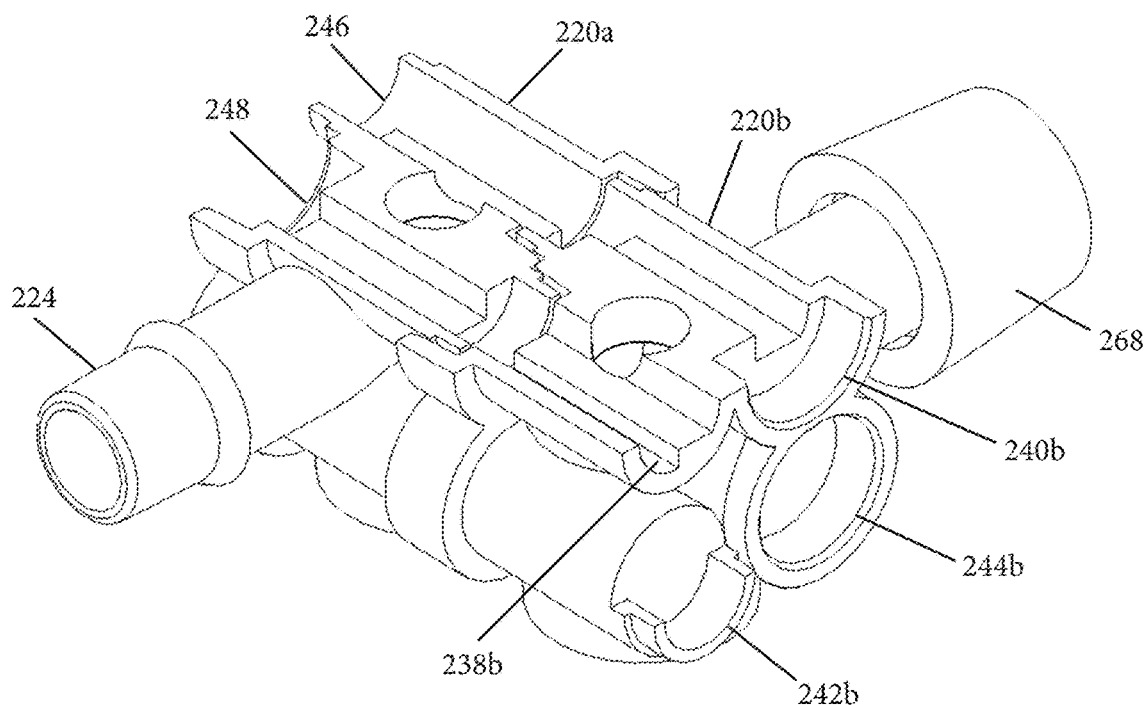
FIGS. 16A and 16B are sectional perspective views of the portions of a pair of valve bases of the three-way modular valve assembly of FIG. 9 illustrating internal passages in a second orientation.
Figure 16B:
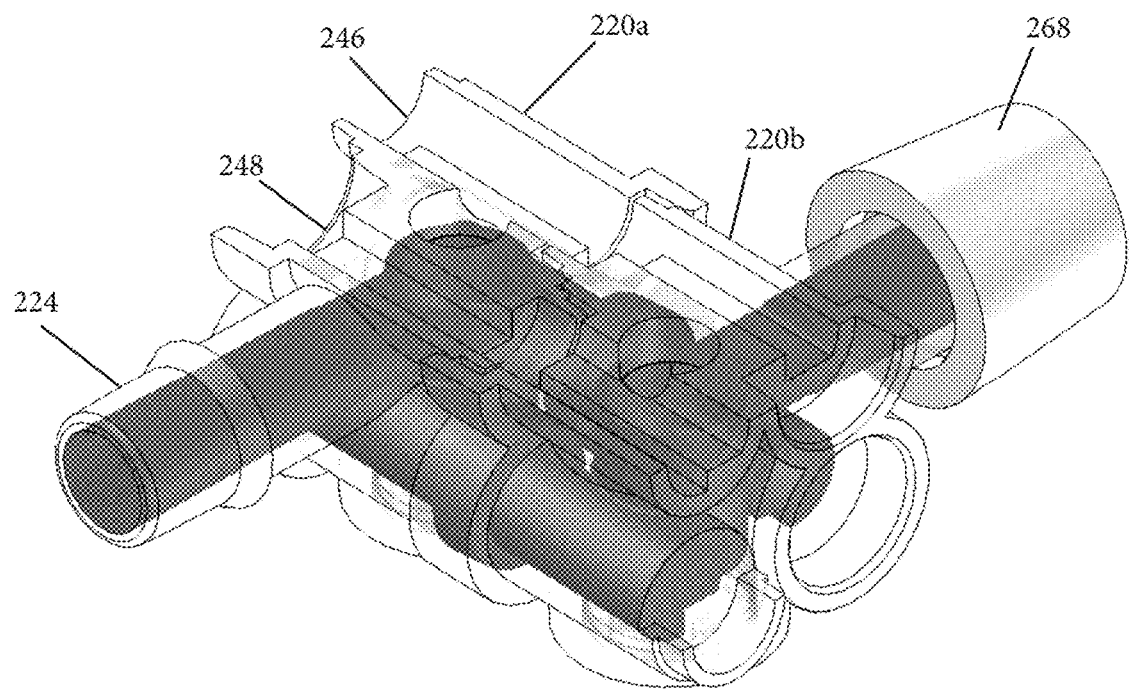
Figure 17A:
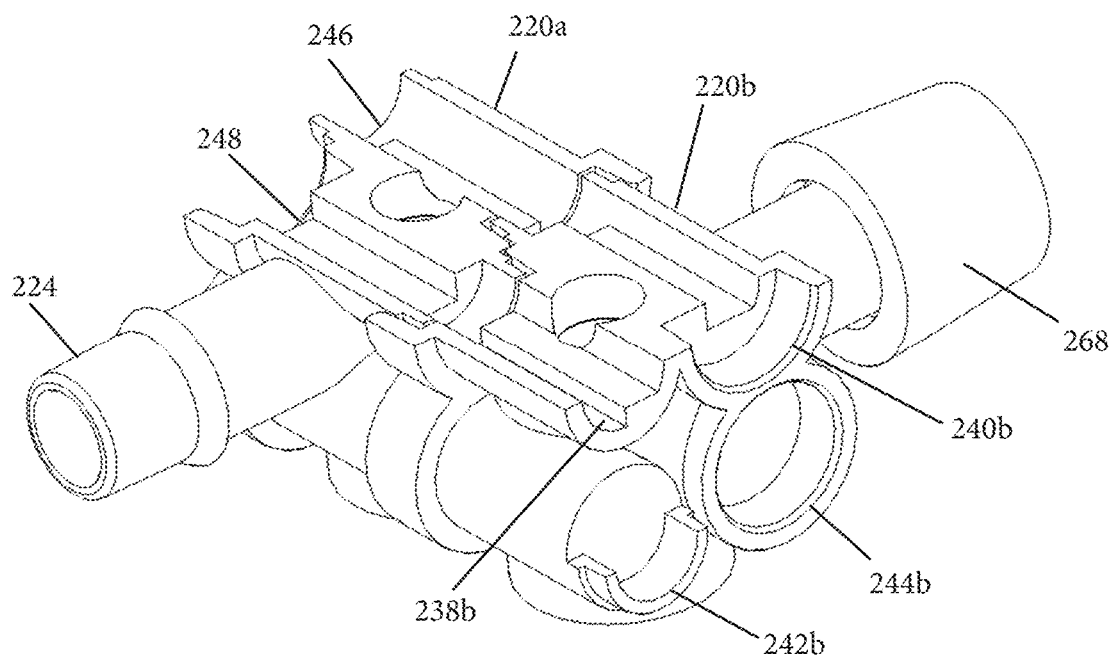
FIGS. 17A and 17B are sectional perspective views of portions of a pair of valve bases of the three-way modular valve assembly of FIG. 9 illustrating internal passages in a third flow communication orientation.
Figure 17B:
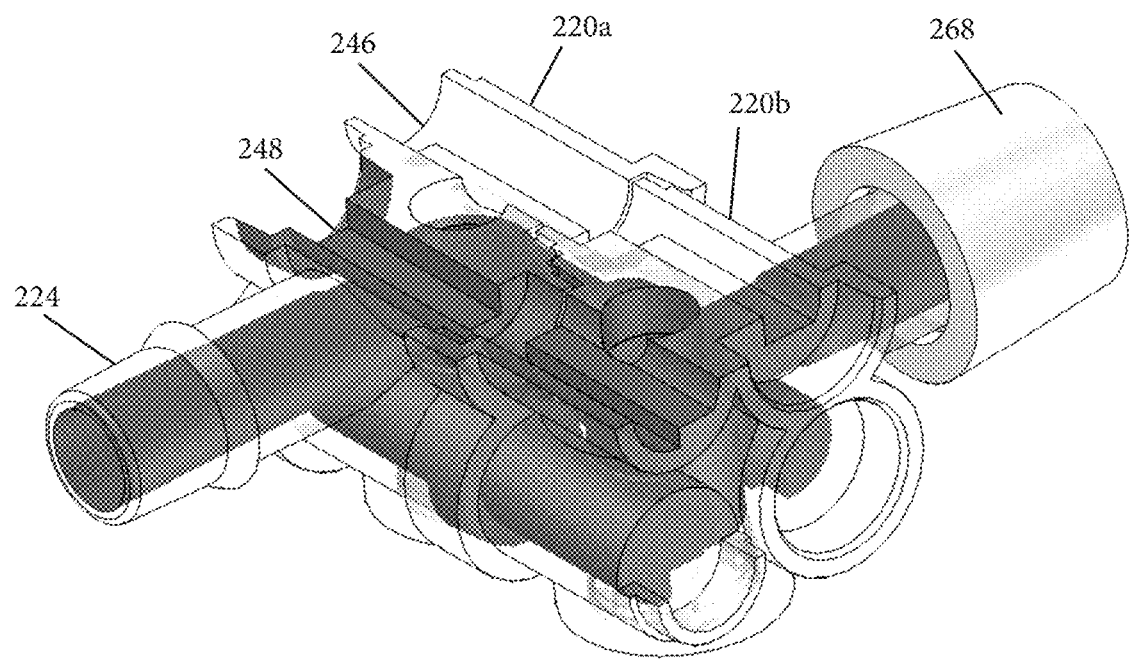

FIGS. 15A-17B illustrate a pair of side-by-side valve bases 220a and 220b, with the valve bases 220a, 220b being connected in reversed orientation with respect to each other to obtain a fill process (FIGS. 15A and 15B), a hold orientation (FIGS. 16A and 16B) and a dump process (FIGS. 17A and 17B).

FIGS. 15A and 15B illustrate a setting in which the actuator 210 of the valve base 220a is on or energized and the actuator 210 of the valve base 220b is off or un-energized. As such, flow within channel or passage 246 is connected to output port 224a to enable a fill process through output port 224a. The shading of FIG. 15B illustrates the flow media being within channel 246 and isolated to the pair of adjacent valve bases 220a, 220b.

FIGS. 16A and 16B illustrate a setting in which the actuators 210 of valve base 220a and valve base 220b are both off or un-energized. As such, output port 224a is isolated from both channels or passages 246 and 248. The shading of FIG. 16B illustrates the flow media is not flowing within either of channels 246, 248 such that a holding of the fluid media in the system is maintained.

FIGS. 17A and 17B illustrate a setting in which the actuator 210 of the valve base 220a is off or un-energized and the actuator 210 of the valve base 220b is on or energized. As such, passageway 248 is connected to output port 224a to enable a dump process via the port 224a. The shading of FIG. 17B illustrates the flow media being within channel 248.

The configuration of FIGS. 15A-17B thus enable a fill and dump system to be provided in which a three-way modular valve assembly 200 may be configured whereby selected reverse oriented pairs of modular valves 202 may be cooperatively used to fill and dump a given "zone" to which the assembly 200 is connected without the need for multiple connecting supply lines for each such zone. For example, modular valve assembly 200 may be used with a medical mattress having multiple zones or chambers with a single supply line of compressed air being provided to modular valve assembly 200, with assembly 200 enabling the cooperating pairs of modular valves 202 to be used to independently regulate each of the chambers.

Although shown as each valve body 220 including an output port 224, it should be appreciated that selected valve bodies may be produced without an output port whereby in the orientation of FIGS. 15A-17B, a modular valve assembly 200 may be configured without the need for caps 268. Still further, it should also be appreciated that an alternative modular valve assembly may be configured in which each of the valve bodies are oriented in the same manner to provide a traditional manifold having alternative functionality from that of modular valve assembly 200. The valve bases 220 are formed of plastic, such as molded plastic, in the illustrated embodiment. Alternatively, valve bases may be formed of a metal or metal alloy, such as a molded or machined metal or metal alloy.

The exemplary embodiments of modular valves and modular valve assemblies provide for the flexible arrangement of modular valves in any desired order and orientation through the use of reversible valve bases and selectable outlet ports. A single two-way or three-way modular valve may be orientated/reversed with relation to other modular valves in the valve assembly to provide for different outlet ports/and inlet port combinations, operation and functionality.

As noted above, in modular valve assembly 20 the adjacent modular valves 22 are sealingly joined together via expandable valves 330. The structure, construction and operation of the illustrated expandable valves 330 will now be addressed in connection with FIGS. 18-23.

Figure 18:
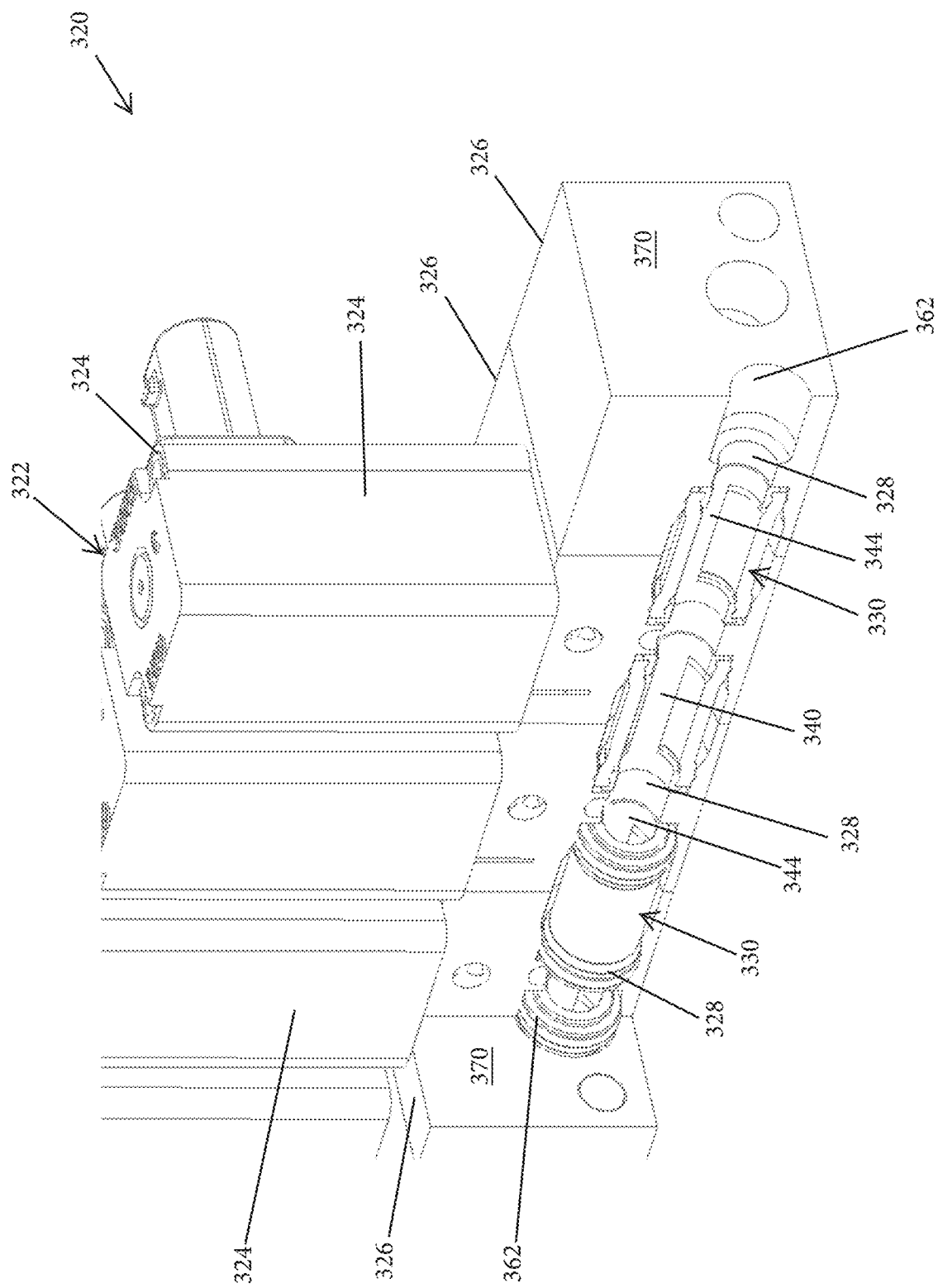
FIG. 18 is a partial perspective sectional view showing expandable seals in accordance with an aspect of the present invention installed in a manifold configured as a two-way modular valve assembly with two of the seals shown in section.
Figure 19:
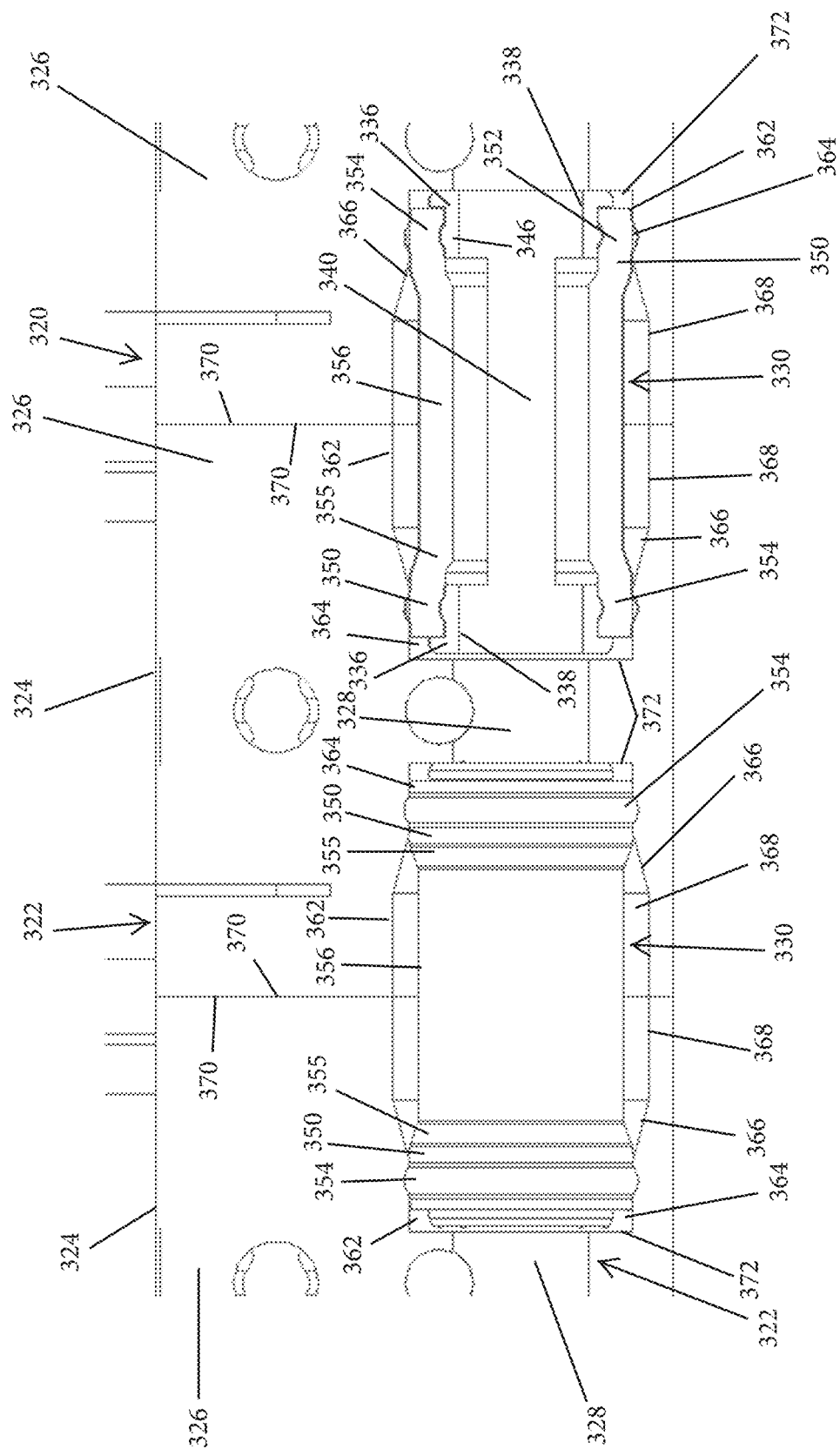
FIG. 19 is a partial side plan sectional view of the two-way modular valve assembly of FIG. 18 showing the expandable seals installed between connected modular valves.

As understood from FIGS. 18 and 19, a modular manifold or valve assembly 320 is disclosed that is made up of multiple connected sections or modular valves 322, where each section 322 includes an actuator 324 configured as an electronic actuator or solenoid and a base or body 326. Each base 326 includes a channel or passageway 328 that is aligned together with the channels 328 of other bases 326 when the bases 326 are assembled together, where the channels 328 enable flow through the bases 326. In accordance with the present invention an expandable seal 330 is disposed in the assembly 320 between adjacent bases 326, where seal 330 inhibits or prevents leaking of the fluid, such as a liquid or a gas, flowing through the passageways 328 of the assembly 320. For example, this may include water or other liquids as well as compressed air.

Figure 20:
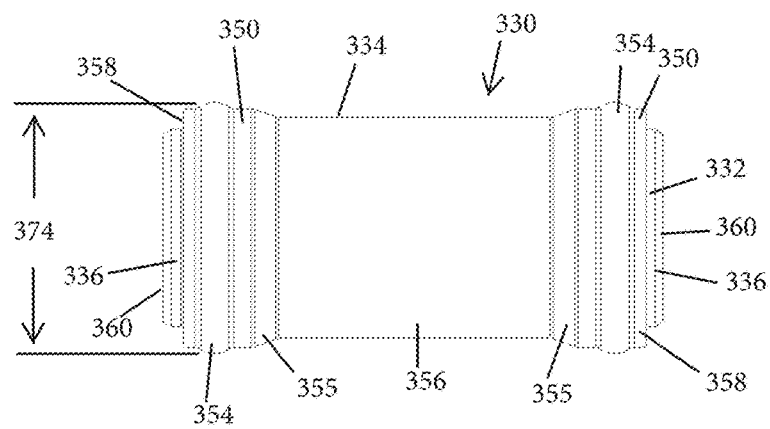
FIG. 20 is a side elevation view of a seal in accordance with the present invention shown removed from the assembly of FIG. 18.
Figure 21:
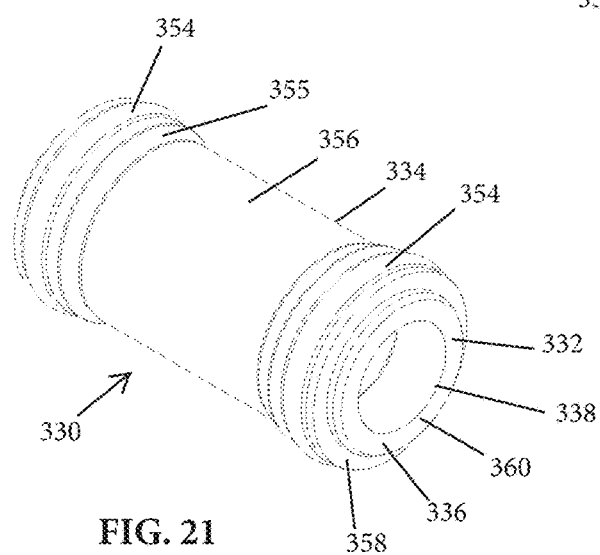
FIG. 21 is a perspective view of the seal of FIG. 20.
Figure 22:
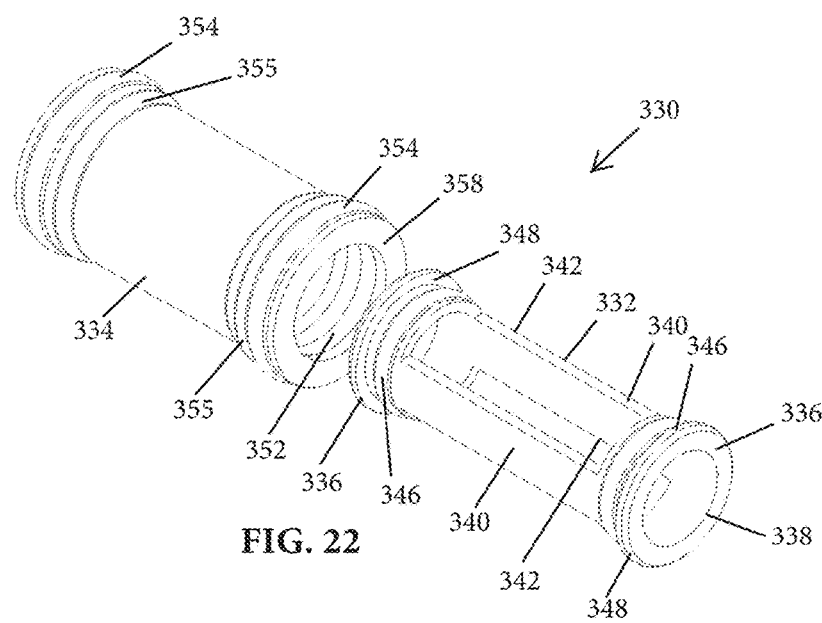
FIG. 22 is an exploded perspective view of the seal of FIG. 18.

With further reference to FIGS. 20-22, seal 330 is generally cylindrical and includes an internal rigid support or frame 332 with an outer flexible cover 334, where in the illustrated embodiment cover 334 is molded over support 332. In the illustrated embodiment seal 330 comprises a generally cylindrical tubular frame 332 and cover 334 configuration. Alternatively shaped configurations, however, may be employed within the scope of the present invention.

Support 332 includes a pair of circumferential ends 336 that define complete circles with openings 338, and includes ribs 340 extending between ends 336. The configuration of ends 336 and ribs 340 thus form or define apertures 342 in support 332 such that support 332 does not include a solid sided wall whereby fluid flowing through the central passage 344 of seal 330 is not constrained within support 332. Each end 336 includes circumferential grooves or channels 346, where in the illustrated embodiment the grooves 346 have a generally "W" shaped profile and are located adjacent flanges 348 on each end 336.

Cover 334 is flexible, and in the illustrated embodiment is an elastomeric material that is generally cylindrical and includes ends 350, where grooves 346 of support 332 are configured to receive ends 350 of cover 334 and ends 350 have a generally inverted internal "V" shaped profile or ridges 352 for mating with the profile of grooves 346. Cover 334 additionally includes external circumferentially disposed bulges or projections 354, where projections 354 form or define seals or sealing projections that extend radially outwardly and in the illustrated embodiment are semicircular and are radially aligned with the internal ridges 352. Each end 350 further includes an expansion baffle 355, and between ends 350 cover 334 comprises a cylindrical central section 356. In the illustrated embodiment central section 356 is approximately of the same length as apertures 342 and defines an expansion zone.

As discussed in more detail below, baffles 355 comprises an expansion joint to aid in allowing center section 356 to expand as necessary. Moreover, other than the openings defined by ends 350 defining the central passage of seal 330, cover 334 is free from apertures such as holes or perforations whereby cover 334 defines or comprises a solid generally cylindrical wall portion whereby cover 334 is able to contain fluids to the internal diameter of cover 334 and seal or prevent fluids from flowing outside of cover 334.

As understood from FIGS. 20 and 21, ends 336 of support 332 extend outwardly from ends 350 of cover 334. In an alternative embodiment, however, ends 350 of cover 334 may extend further longitudinally whereby the distal faces 358 of ends 350 of cover 334 are located at or even beyond the distal faces 360 of ends 336 of support 332. In particular, ends 350 of cover 334 may be constructed to overlap ends 36, including extending radially inwardly over faces 360 of ends 336.

FIGS. 20 and 21 disclose seal 330 in an unexpanded orientation, where center section 354 may be normally disposed to be in contact with ribs 340 of support 332. Accordingly, center section 356 is inhibited from collapsing beyond the internal diameter of support 332, such as defined by ribs 340. As understood from FIGS. 18 and 19, each adjacent body 326 includes a receiving hole or cavity 362 configured to align when adjacent bodies 326 are mated together, such as by a snap fit connection, fastener or otherwise. Each cavity 362 includes a sealing bore 364 defining a sealing surface, a chamfer 366 and an expansion bore 368, where the expansion bore 368 is formed at the mating surface 370 of each body 326. Each cavity 362 additionally includes a shoulder 372 at the junction of cavities 362 with passageways 328 due to passageways 328 having a smaller diameter than sealing bore 364. It should be appreciated that each body may have a corresponding receiving cavity 362 on each side or at each mating surface 370, and that cavities 362 form a portion of passageways 328 to enable fluid to flow there through.

In the illustrated embodiment, the overall length of seal 330 is just less than the distance between shoulders 372 of adjacent mating cavities 362, such as defined by the length of support 332. When seal 330 is installed within the cavities 362 of adjacent bodies 326 that are connected together, sealing projections 354 of each end 350 of cover 334 are disposed within sealing bores 364 of adjacent bodies 326. In particular, the diameter of sealing bores 364 is sized so as to be smaller than the normal, uncompressed outer diameter 374 (FIG. 20) defined by sealing projections 354. Upon installation, the sealing projections 354 compress within sealing bores 364 so as to form a seal preventing or inhibiting fluids from flowing there past out of passageways 328. Ends 350 of cover 334 thus define a seal compression zone.

In addition, when the fluid flowing through passageways 328 is a fluid that is subject to expansion, seal 330 is operable to allow for the expansion without compromising the structural integrity of the mating bodies and seal 330. In particular, for example, when the fluid flowing through passageways 328 is water and the water freezes whereby it expands, the expansion will occur through the apertures 342 of support 332 and will expand cover 334, in particular center section 356 towards the expansion bores 368 of bodies 326. This ability to accommodate the expansion of the fluid when it freezes and expands thus protects against damage to the manifold assembly 320.

Figure 23:
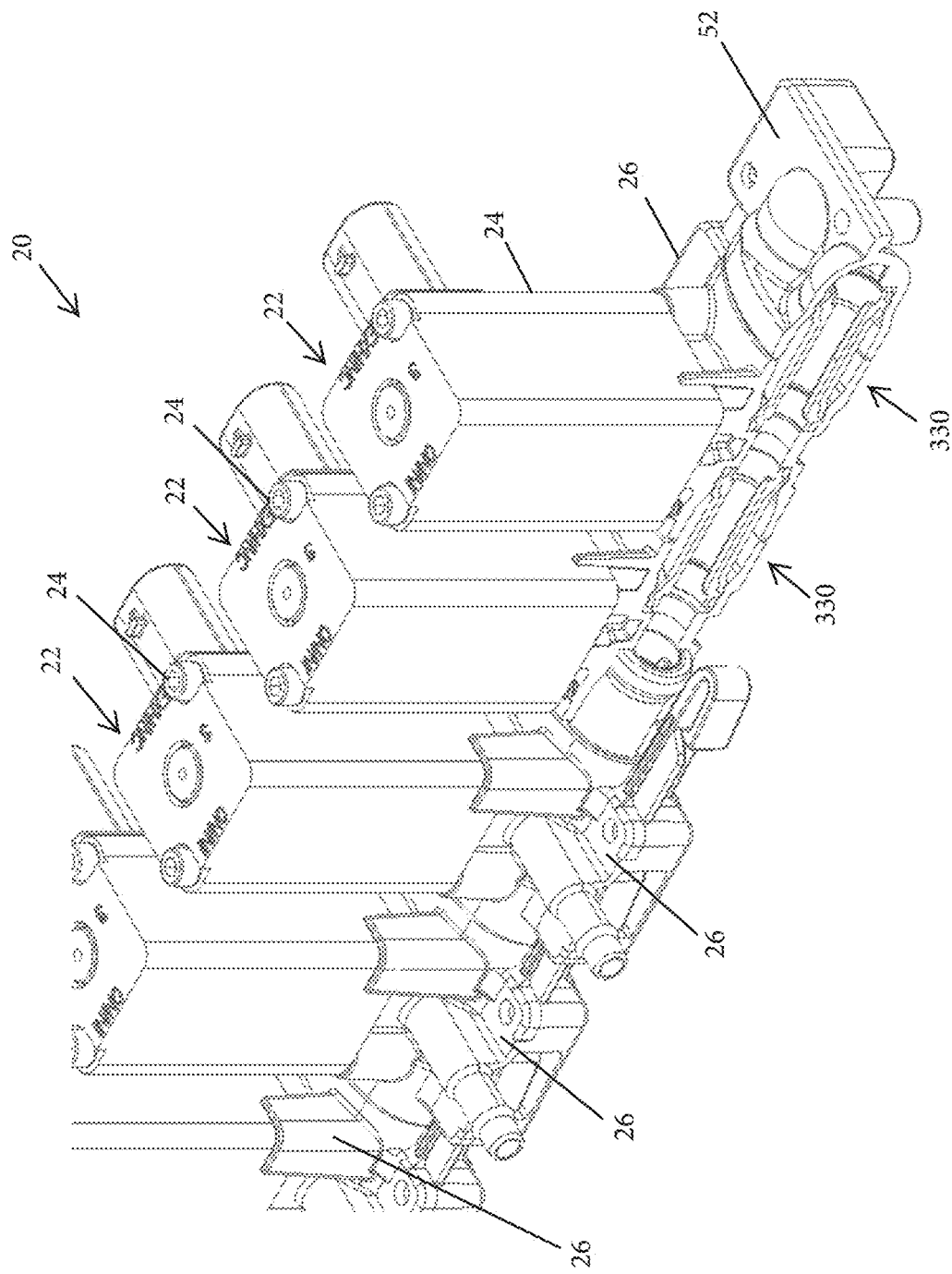
FIG. 23 is a partial perspective sectional view showing seals in accordance with the present invention installed in the manifold assembly of FIG. 1 with the seals shown in section.

With reference to FIG. 23, the above discussed modular manifold or valve assembly 20 is illustrated with multiple individual sections or modular valves 22 that are connected together, with each modular valve 22 including an actuator 24 coupled to a valve base or valve body 26. As discussed above and shown in FIG. 23, and in like manner to manifold assembly 320, modular valve assembly 20 utilizes multiple seals 330 disposed between individual adjacent and mating valve bodies 26 of modular valves 22. FIG. 23 additionally illustrates a seal 330 disposed between a body 26 and a cap or plug 52.

As noted above the support is constructed of a rigid material, such as a rigid plastic, metal or other material. Although the cover is discussed above as being an elastomeric material, it should be appreciated that alternative materials may be employed. For example, the cover could be constructed of a closed cell foam material with the foam compressing during ice expansion, thus eliminating the need for an expansion bore. Still further, although the illustrated expandable seal 330 is shown configured as a two-part seal it should be appreciated that alternative embodiments may be employed within the scope of the present invention, including a single or unitarily constructed expandable seal. For example, a single component or unitary expandable seal may be constructed having substantially similar outside geometry as that shown in FIGS. 20 and 21. Such an alternative expandable seal may be constructed of silicon or other suitable material, where the geometry at the ends and faces is constructed to be thicker to provide rigidity, but the material at the central section of the seal is thinner to enable flexing of the seal. Still further, the material, such as the noted silicon, would be compliant at the sealing projections (reference number 354 with regard to the embodiment of FIG. 20).

Changes and modifications in the specifically described embodiments can be carried out without departing from the principles of the present invention which is intended to be limited only by the scope of the appended claims, as interpreted according to the principles of patent law including the doctrine of equivalents.

The embodiments of the invention in which an exclusive property or privilege is claimed are defined as follows:

1. A modular valve assembly comprising:
   a plurality of interconnected modular valves, wherein each said modular valve comprises a valve base and a valve actuator;
   wherein each said valve base includes at least a first channel disposed and extending between first channel end ports and a second channel disposed and extending between second channel end ports, wherein said first channel end ports comprise a single end port at one end of said first channel and a single port at the opposite end of said first channel, and wherein said second channel end ports comprise a single port at one end of said second channel and a single end port at the opposite end of said second channel;
   wherein each said valve base includes an internal passage forming an internal opening in said first channel with said internal passage being in selective fluid communication with an exterior port of said valve base, and wherein said second channel is a through passage that only passes through said valve base and does not include any other ports other than said second channel end ports and is not in fluid communication with said internal passage;
   wherein adjacent said valve bases are interconnectable at said end ports of said first channel and said second channel of adjacent said valve bases in one of two orientations either with said first channel and said second channel of one said valve base aligned with said first channel and said second channel, respectively, of an adjacent said valve base or with said first channel and said second channel of one said valve base aligned with said second channel and said first channel, respectively, of an adjacent said valve base, wherein two flow paths are defined through aligned said first channels and said second channels of interconnected said valve bases.

2. The modular valve assembly of claim 1, wherein said first channel and said second channel of each said valve base are oriented in parallel.

3. The modular valve assembly of claim 1, wherein said exterior port comprises a first exterior port and wherein at least some of said valve bases include a second exterior port opposite said first exterior port.

4. The modular valve assembly of claim 1, wherein said first channel end ports comprise a male port at one end of said first channel and a female port at the opposite end of said first channel, and wherein said second channel end ports comprise a male port at one end of said second channel and a female port at the opposite end of said second channel, and wherein said male port of said first channel is adjacent said female port of said second channel and said female port of said first channel is adjacent said male port of said first channel.

5. The modular valve assembly of claim 1, wherein said valve bases include a top side and wherein said top side includes a first opening in communication with said internal passage and a second opening in communication with said exterior port.

6. The modular valve assembly of claim 1, wherein valve bases are in adjacent mating engagement at mating surfaces of said valve bases, and wherein each said valve base includes at least one cavity disposed at said mating surface with said cavities of adjacent said valve bases being aligned when said valve bases are engaged together;
   wherein an expandable seal is disposed in adjacent aligned cavities with said expandable seal contacting sealing surfaces in each of said cavities.

7. The modular valve assembly of claim 6, wherein said expandable seal comprises a flexible cover disposed about a rigid internal support.

8. The modular valve assembly of claim 7, wherein said support has a pair of distally opposed support ends with said support including at least one aperture between said support ends, and with said cover having a pair of distally opposed cover ends, with each said cover end being engaged with an external portion of a respective one of said support ends, and wherein said cover includes a central section disposed between said cover ends with said central section being disposed over said aperture of said support.

9. The modular valve assembly of claim 1, wherein said modular valve bases are adjoiningly interconnected via expandable seals, wherein each said seal comprises:
   an elongate seal body having opposed open ends defining a passage through said seal body; and
   a flexible outer cover disposed between said opposed ends;
   wherein one of said seals is inserted into one of said first channel end ports or one of said second channel end ports of one said valve base and is inserted into one of said first channel end ports or one of said second channel end ports of an adjacent said valve base.

10. The modular valve assembly of claim 9, wherein said seal body comprises a rigid support configured as a separate component from said flexible cover with said support including an aperture between said open ends, and wherein said open ends comprise a pair of distally opposed support ends with said aperture disposed between said support ends, and with said cover having a pair of distally opposed cover ends, with each said cover end being engaged with an external portion of a respective one of said support ends, and wherein said cover includes a central section disposed between said cover ends with said central section being disposed over said aperture of said support.

11. A modular valve comprising:

a valve base and a valve actuator;

wherein said valve base includes at least a first channel disposed and extending between first channel end ports and a second channel disposed and extending between second channel end ports, wherein said first channel end ports comprise a single end port at one end of said first channel and a single port at the opposite end of said first channel, and wherein said second channel end ports comprise a single port at one end of said second channel and a single end port at the opposite end of said second channel;

wherein said valve base includes an internal passage forming an internal opening in said first channel with said internal passage being in selective fluid communication with an exterior port of said valve base via said valve actuator, and wherein said second channel is a through passage that only passes through said valve base and does not include any other ports other than said second channel end ports and is not in fluid communication with said internal passage, and wherein said first channel and said second channel are oriented in parallel and said valve base is configured to be connected to another valve base via one of said first channel end ports and one of said second channel end ports.

12. The modular valve of claim 11, wherein said valve base includes another exterior port.

13. The modular valve of claim 11, wherein said first channel end ports comprise a male port at one end of said first channel and a female port at the opposite end of said first channel, and wherein said second channel end ports comprise a male port at one end of said second channel and a female port at the opposite end of said second channel, and wherein said male port of said first channel is adjacent said female port of said second channel and said female port of said first channel is adjacent said male port of said first channel.

14. The modular valve of claim 11, wherein said valve base includes a top side and wherein said top side includes a first opening in communication with said internal passage and a second opening in communication with said exterior port.

15. The modular valve of claim 11, wherein said first channel end ports comprise cavities and said second channel end ports comprise cavities, and wherein said cavities of said first channel end ports and said second channel end ports are configured to receive expandable seals with said expandable seals comprising a flexible cover disposed about a rigid internal support and being configured to contact sealing surfaces in said cavities.

16. The modular valve of claim 15, wherein said support has a pair of distally opposed support ends with said support including at least one aperture between said support ends, and with said cover having a pair of distally opposed cover ends, with each said cover end being engaged with an external portion of a respective one of said support ends, and wherein said cover includes a central section disposed between said cover ends with said central section being disposed over said aperture of said support.

17. A modular valve assembly comprising:

a plurality of interconnected modular valves, wherein each said modular valve comprises a valve base and a valve actuator;

wherein each said valve base includes at least a first channel disposed and extending between first channel end ports and a second channel disposed and extending between second channel end ports, wherein each said valve base includes an internal passage forming an internal opening in said first channel with said internal passage being in selective fluid communication with an exterior port of said valve base, and wherein said second channel comprises a through passage that is not in fluid communication with said internal passage;

wherein adjacent said valve bases are interconnectable in one of two orientations either with said first channel and said second channel of one said valve base aligned with said first channel and said second channel, respectively, of an adjacent said valve base or with said first channel and said second channel of one said valve base aligned with said second channel and said first channel, respectively, of an adjacent said valve base;

wherein said internal passage of said valve bases comprises a valve bore, and wherein said valve bases include a third channel disposed and extending between third channel end ports and a fourth channel disposed and extending between fourth channel end ports;

wherein when adjacent said valve bases are interconnected with said first channel and said second channel of said one said valve base aligned with said first channel and said second channel, respectively, of said adjacent said valve base, said third channel and said fourth channel of said one said valve base are aligned with said third channel and said fourth channel, respectively, of said adjacent said valve base; and wherein when adjacent said valve bases are interconnected with said first channel and said second channel of said one said valve base aligned with said second channel and said first channel, respectively, of said adjacent said valve base, said third channel and said fourth channel of said one said valve base are aligned with said fourth channel and said third channel, respectively, of said adjacent said valve base.

18. The modular valve assembly of claim 17, wherein said valve bore forms an opening in said third channel and an opening in said fourth channel whereby said third channel and said fourth channel are in selective fluid communication with said exterior port.

19. The modular valve assembly of claim 18, wherein an internal wall is disposed in said third channel and an internal wall is disposed in said fourth channel, and wherein said internal walls block flow through said third channel and said fourth channel.

20. A modular valve comprising:

a valve base and a valve actuator;

wherein said valve base includes at least a first channel disposed and extending between first channel end ports and a second channel disposed and extending between second channel end ports, wherein said valve base includes an internal passage forming an internal opening in said first channel with said internal passage being in selective fluid communication with an exterior port of said valve base via said valve actuator, and wherein said second channel comprises a through passage that is not in fluid communication with said internal passage, and wherein said first channel and said second channel are oriented in parallel and said valve base is configured to be connected to another valve base;

wherein said internal passage of said valve base comprises a valve bore, and wherein said valve base includes a third channel disposed and extending between third channel end ports and a fourth channel disposed and extending between fourth channel end ports, and wherein said third channel and said fourth channel are oriented in parallel; and wherein said valve bore forms an opening in said third channel and an opening in said fourth channel whereby said third channel and said fourth channel are in selective fluid communication with said exterior port.

21. The modular valve of claim 20, wherein an internal wall is disposed in said third channel and an internal wall is disposed in said fourth channel, and wherein said internal walls block flow through said third channel and said fourth channel.

\* \* \* \* \*